US012608175B2

(12) United States Patent
Adelman et al.

(10) Patent No.: US 12,608,175 B2
(45) Date of Patent: Apr. 21, 2026

(54) BFLOAT16 SQUARE ROOT AND/OR RECIPROCAL SQUARE ROOT INSTRUCTIONS

(71) Applicant: Intel Corporation, Santa Clara, CA (US)

(72) Inventors: Menachem Adelman, Haifa (IL); Alexander Heinecke, San Jose, CA (US); Robert Valentine, Kiryat Tivon (IL); Zeev Sperber, Zikhron Yaakov (IL); Amit Gradstein, Binyamina (IL); Mark Charney, Lexington, MA (US); Evangelos Georganas, San Mateo, CA (US); Dhiraj Kalamkar, Bangalore (IN); Christopher Hughes, Santa Clara, CA (US); Cristina Anderson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 999 days.

(21) Appl. No.: 17/463,374

(22) Filed: Aug. 31, 2021

(65) Prior Publication Data

US 2023/0061618 A1 Mar. 2, 2023

(51) Int. Cl.
G06F 7/552 (2006.01)
G06F 9/30 (2018.01)

(52) U.S. Cl.
CPC .......... G06F 7/5525 (2013.01); G06F 9/3001 (2013.01); G06F 9/30101 (2013.01); G06F 9/3016 (2013.01); G06F 2207/5521 (2013.01)

(58) Field of Classification Search
CPC .............................. G06F 9/3016; G06F 7/225
See application file for complete search history.

(56) References Cited

U.S. PATENT DOCUMENTS 4,815,021 A 3/1989 Steiner et al.
5,500,947 A 3/1996 Uhler et al.
(Continued)

FOREIGN PATENT DOCUMENTS

CN 112199119 A 1/2021
EP 3796154 A1 3/2021
(Continued)

OTHER PUBLICATIONS

European Search Report and Search Opinion, EP App. No. 22188067.7, Jan. 25, 2023, 12 pages.
(Continued)

*Primary Examiner* — Michael J Metzger
(74) *Attorney, Agent, or Firm* — Nicholson De Vos Webster & Elliott LLP

(57) ABSTRACT

Techniques for performing square root or reciprocal square root calculations on BF16 data elements in response to an instruction are described. An example of an instruction is one that includes fields for an opcode, an identification of a location of a packed data source operand, and an identification of a packed data destination operand, wherein the opcode is to indicate that execution circuitry is to perform, for each data element position of the packed data source operand, a calculation of a square root value of a BF16 data element in that position and store a result of each square root into a corresponding data element position of the packed data destination operand.

17 Claims, 20 Drawing Sheets

VSQRTNEPBF16 DEST{WRITEMASK}, SOURCE

(56) References Cited

U.S. PATENT DOCUMENTS

| | | | |
|---|---|---|---|
| 6,105,129 | A | 8/2000 | Meier et al. |
| 6,247,117 | B1 | 6/2001 | Juffa |
| 6,487,653 | B1 | 11/2002 | Oberman et al. |
| 9,448,765 | B2 | 9/2016 | Anderson et al. |
| 9,606,770 | B2 | 3/2017 | Anderson et al. |
| 9,785,435 | B1 | 10/2017 | Bradbury et al. |
| 11,182,337 | B1 | 11/2021 | Maiyuran et al. |
| 11,204,977 | B2 | 12/2021 | Maiyuran et al. |
| 11,366,663 | B2 | 6/2022 | Heinecke et al. |
| 11,372,643 | B2 | 6/2022 | Heinecke et al. |
| 11,714,998 | B2 | 8/2023 | Abuhatzera et al. |
| 2003/0018676 | A1 | 1/2003 | Shaw |
| 2005/0055534 | A1 | 3/2005 | Moyer |
| 2005/0216701 | A1 | 9/2005 | Taylor |
| 2008/0040591 | A1 | 2/2008 | Moyer et al. |
| 2008/0091991 | A1 | 4/2008 | Kapoor et al. |
| 2011/0047358 | A1 | 2/2011 | Eichenberger et al. |
| 2013/0097408 | A1 | 4/2013 | Seal et al. |
| 2013/0212354 | A1 | 8/2013 | Mimar |
| 2014/0067894 | A1 | 3/2014 | Plondke et al. |
| 2015/0088946 | A1 | 3/2015 | Anderson et al. |
| 2015/0324949 | A1 | 11/2015 | Alsup |
| 2016/0179515 | A1* | 6/2016 | San Adrian ........... G06F 9/4552 |
| | | | 712/221 |
| 2016/0224512 | A1 | 8/2016 | Moudgill et al. |
| 2017/0286118 | A1 | 10/2017 | Coleman et al. |
| 2018/0004514 | A1 | 1/2018 | Brown et al. |
| 2019/0042193 | A1 | 2/2019 | Pasca et al. |
| 2019/0042244 | A1 | 2/2019 | Henry et al. |
| 2019/0079767 | A1 | 3/2019 | Heinecke et al. |
| 2019/0079768 | A1 | 3/2019 | Heinecke et al. |
| 2019/0114173 | A1 | 4/2019 | Dang et al. |
| 2019/0196790 | A1* | 6/2019 | Anderson ........... G06F 9/30145 |
| 2019/0220278 | A1 | 7/2019 | Adelman et al. |
| 2019/0303743 | A1 | 10/2019 | Venkataramani et al. |
| 2019/0384575 | A1 | 12/2019 | Hickmann et al. |
| 2020/0184309 | A1 | 6/2020 | Patel |
| 2020/0264931 | A1 | 8/2020 | Herath et al. |
| 2020/0371794 | A1 | 11/2020 | Zbiciak et al. |
| 2020/0371805 | A1 | 11/2020 | Lutz |
| 2021/0049463 | A1 | 2/2021 | Ruff |
| 2021/0117194 | A1 | 4/2021 | Heinecke et al. |
| 2021/0157589 | A1 | 5/2021 | Heinecke et al. |
| 2021/0182021 | A1* | 6/2021 | Wang ...................... G06F 7/485 |
| 2021/0216318 | A1* | 7/2021 | Langhammer ...... G06F 9/30072 |
| 2021/0255861 | A1* | 8/2021 | Ramesh .............. G06F 9/30036 |
| 2022/0019431 | A1 | 1/2022 | Kaul et al. |
| 2022/0075624 | A1 | 3/2022 | Venkatachar et al. |
| 2022/0107805 | A1* | 4/2022 | Gore ...................... G06F 7/483 |
| 2022/0121727 | A1 | 4/2022 | Hong et al. |
| 2022/0365751 | A1 | 11/2022 | Varma et al. |
| 2022/0413805 | A1 | 12/2022 | Li et al. |
| 2023/0068781 | A1 | 3/2023 | Adelman et al. |
| 2023/0367599 | A1 | 11/2023 | Waterman et al. |
| 2024/0045681 | A1 | 2/2024 | Heinecke et al. |
| 2024/0045682 | A1 | 2/2024 | Heinecke et al. |
| 2025/0004762 | A1 | 1/2025 | Mehendale et al. |

FOREIGN PATENT DOCUMENTS

| | | |
|---|---|---|
| GB | 2186105 A | 8/1987 |
| WO | 2008/036946 A1 | 3/2008 |
| WO | 2020/190814 A1 | 9/2020 |

OTHER PUBLICATIONS

European Search Report and Search Opinion, EP App. No. 22188069. 3, Jan. 25, 2023, 10 pages.

European Search Report and Search Opinion, EP App. No. 22188079. 2, Jan. 25, 2023, 10 pages.

Notification of Publication of Patent Application for Invention, CN App. No. 202210866252.7, Mar. 8, 2023, 3 pages (1 page of English Translation and 2 pages of Original Document).

Office Action , EP App. No. 22185939.0, Aug. 22, 2023, 05 pages.

Office Action , EP App. No. 22185990.3, Aug. 22, 2023, 05 pages.

Wikipedia, "bfloat16 floating-point format", available online at <https://en.wikipedia.org/w/index.php?title=Bfloat16_floating-point_ format&oldid=1033549871>, Jul. 14, 2021, 4 pages.

Intel, "Intel® Architecture Instruction Set Extensions and Future Features Programming Reference", Reference No. 319433-032, Jan. 2018, 137 pages.

Notification of Oral Proceeding, EP App. No. 22185990.3, Mar. 22, 2024, 9 pages.

Decision to grant, EP App. No. 22183762.8, Feb. 15, 2024, 2 pages.

Intention to grant, EP App. No. 22183762.8, Oct. 11, 2023, 7 pages.

European Search Report and Search Opinion, EP App. No. 22185939. 0, Jan. 20, 2023, 9 pages.

European Search Report and Search Opinion, EP App. No. 22185990. 3, Jan. 20, 2023, 10 pages.

Extended European Search Report and Search Opinion for Application No. 22183762.8, Dec. 21, 2022, 9 pages.

Intel, "Intel (registered) 64 and IA-32 Architectures Software Developer's Manual", vol. 2 (2A, 2B & 2C): Instruction Set Reference, A-Z, Order No. 325383-055US, Jun. 2015, 1011 pages.

Intel, "Intel® Architecture Instruction Set Extensions Programming Reference", Order No. 319433-023, Aug. 1, 2015, 1178 pages.

Brief Communication , EP App. No. 22185939.0, Mar. 10, 2025, 03 pages.

Decision to Grant, EP App. No. 22185990.3, Mar. 6, 2025, 2 pages.

European search report and Search Opinion, EP App. No. 24161663. 0, Jul. 1, 2024, 09 pages.

Extended European search report and Search Opinion , EP App. No. 25156390.4, Apr. 14, 2025, 12 pages.

Final Office Action, U.S. Appl. No. 17/463,390, Jan. 30, 2025, 32 pages.

Final Office Action, U.S. Appl. No. 17/463,398, Feb. 19, 2025, 9 pages.

Intel, "Intel Architecture Software Developer's Manual", vol. 2: Instruction Set Reference, 1999, 854 pages.

Intel, "Intel® 64 and IA-32 Architectures Software Developer's Manual", Combined vols. 1, 2A, 2B, 2C, 2D, 3A, 3B, 3C, 3D, and 4, Order No. 325462-070US, May 2019, 7 pages.

Intel, "Intel 64 and IA-32 Architectures Software Developer's Manual", vol. 2 (2A, 2B & 2C): Instruction Set Reference, A-Z, Jun. 2015, 1513 pages.

Intention to Grant, EP App. No. 22185990.3, Nov. 25, 2024, 6 pages.

Non-Final Office Action, U.S. Appl. No. 17/463,382, Sep. 19, 2024, 5 pages.

Non-Final Office Action, U.S. Appl. No. 17/463,390, Oct. 10, 2024, 37 pages.

Non-Final Office Action, U.S. Appl. No. 17/463,398, Sep. 23, 2024, 8 pages.

Non-Final Office Action, U.S. Appl. No. 17/463,410, Sep. 23, 2024, 24 pages.

Notice of Allowance, U.S. Appl. No. 17/463,382, Apr. 4, 2025, 7 pages.

Notice of Allowance, U.S. Appl. No. 17/463,405, Oct. 7, 2024, 10 pages.

Summons to attend oral proceedings, EP App. No. 22185939.0, Jul. 2, 2024, 09 pages.

Non-Final Office Action, U.S. Appl. No. 17/463,390, Jul. 22, 2025, 28 pages.

* cited by examiner

VSQRTNEPBF16 DEST{WRITEMASK}, SOURCE

VRSQRTNEPBF16 DEST{WRITEMASK}, SOURCE

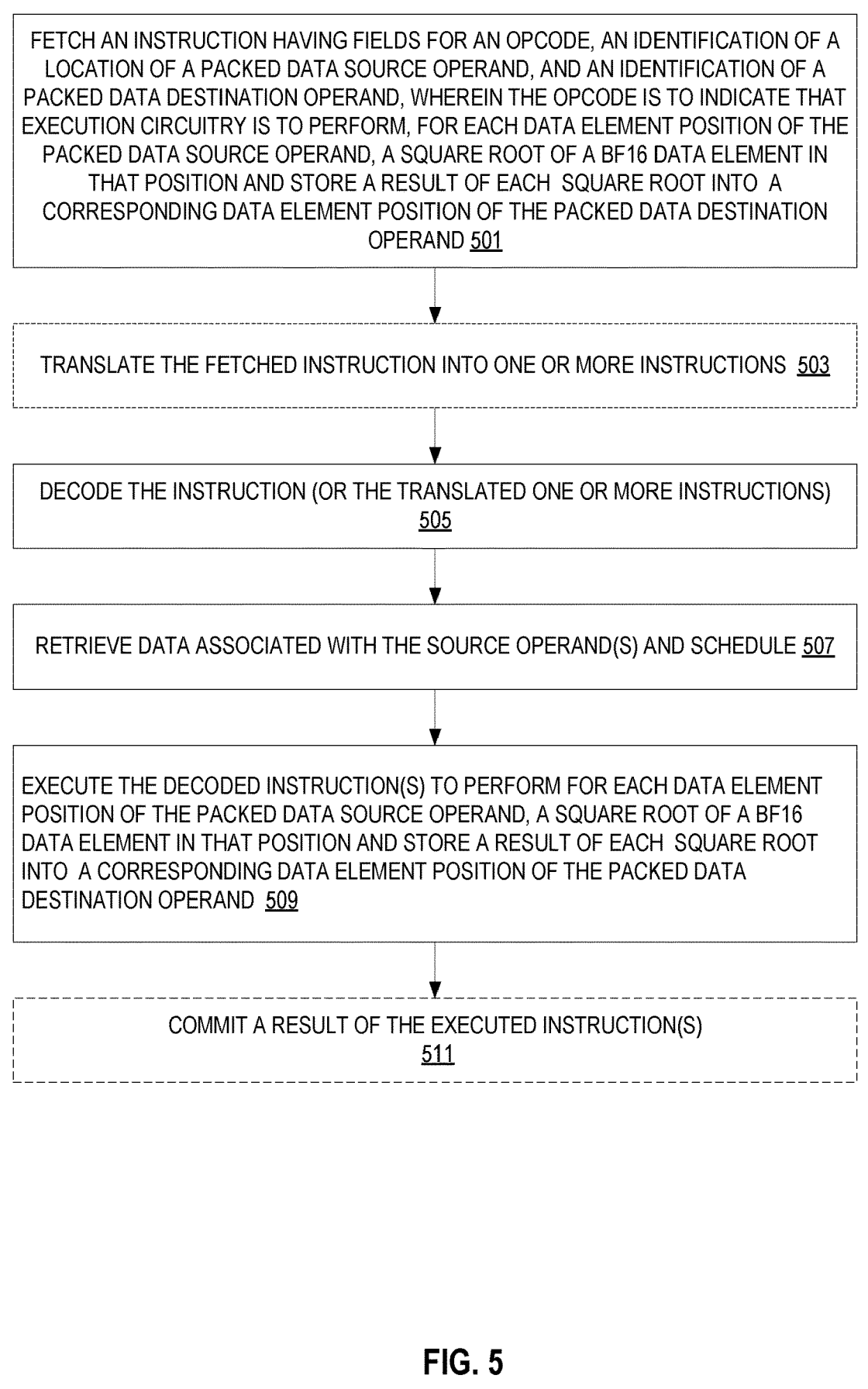

FETCH AN INSTRUCTION HAVING FIELDS FOR AN OPCODE, AN IDENTIFICATION OF A LOCATION OF A PACKED DATA SOURCE OPERAND, AND AN IDENTIFICATION OF A PACKED DATA DESTINATION OPERAND, WHEREIN THE OPCODE IS TO INDICATE THAT EXECUTION CIRCUITRY IS TO PERFORM, FOR EACH DATA ELEMENT POSITION OF THE PACKED DATA SOURCE OPERAND, A SQUARE ROOT OF A BF16 DATA ELEMENT IN THAT POSITION AND STORE A RESULT OF EACH SQUARE ROOT INTO A CORRESPONDING DATA ELEMENT POSITION OF THE PACKED DATA DESTINATION OPERAND 501

TRANSLATE THE FETCHED INSTRUCTION INTO ONE OR MORE INSTRUCTIONS 503

DECODE THE INSTRUCTION (OR THE TRANSLATED ONE OR MORE INSTRUCTIONS) 505

RETRIEVE DATA ASSOCIATED WITH THE SOURCE OPERAND(S) AND SCHEDULE 507

EXECUTE THE DECODED INSTRUCTION(S) TO PERFORM FOR EACH DATA ELEMENT POSITION OF THE PACKED DATA SOURCE OPERAND, A SQUARE ROOT OF A BF16 DATA ELEMENT IN THAT POSITION AND STORE A RESULT OF EACH SQUARE ROOT INTO A CORRESPONDING DATA ELEMENT POSITION OF THE PACKED DATA DESTINATION OPERAND 509

COMMIT A RESULT OF THE EXECUTED INSTRUCTION(S) 511

FIG. 5

```
VSQRTNEPBF16 dest{k1}, src
(KL, VL) = (8, 128), (16, 256), (32, 512)

FOR j := 0 TO KL-1:
    IF k1[j] OR *no writemask*:
        IF SRC is memory and (EVEX.b == 1):
            tsrc := SRC.bf16[0]
        ELSE:
            tsrc := SRC.bf16[j]
        DEST.bf16[j] := SQRT(tsrc) //DAZ, FTZ, RNE, SAE
    ELSE IF *zeroing*:
        DEST.bf16[j] := 0
    // else dest.bf16[j] remains unchanged

DEST[MAX_VL-1:VL] := 0
```

FIG. 6

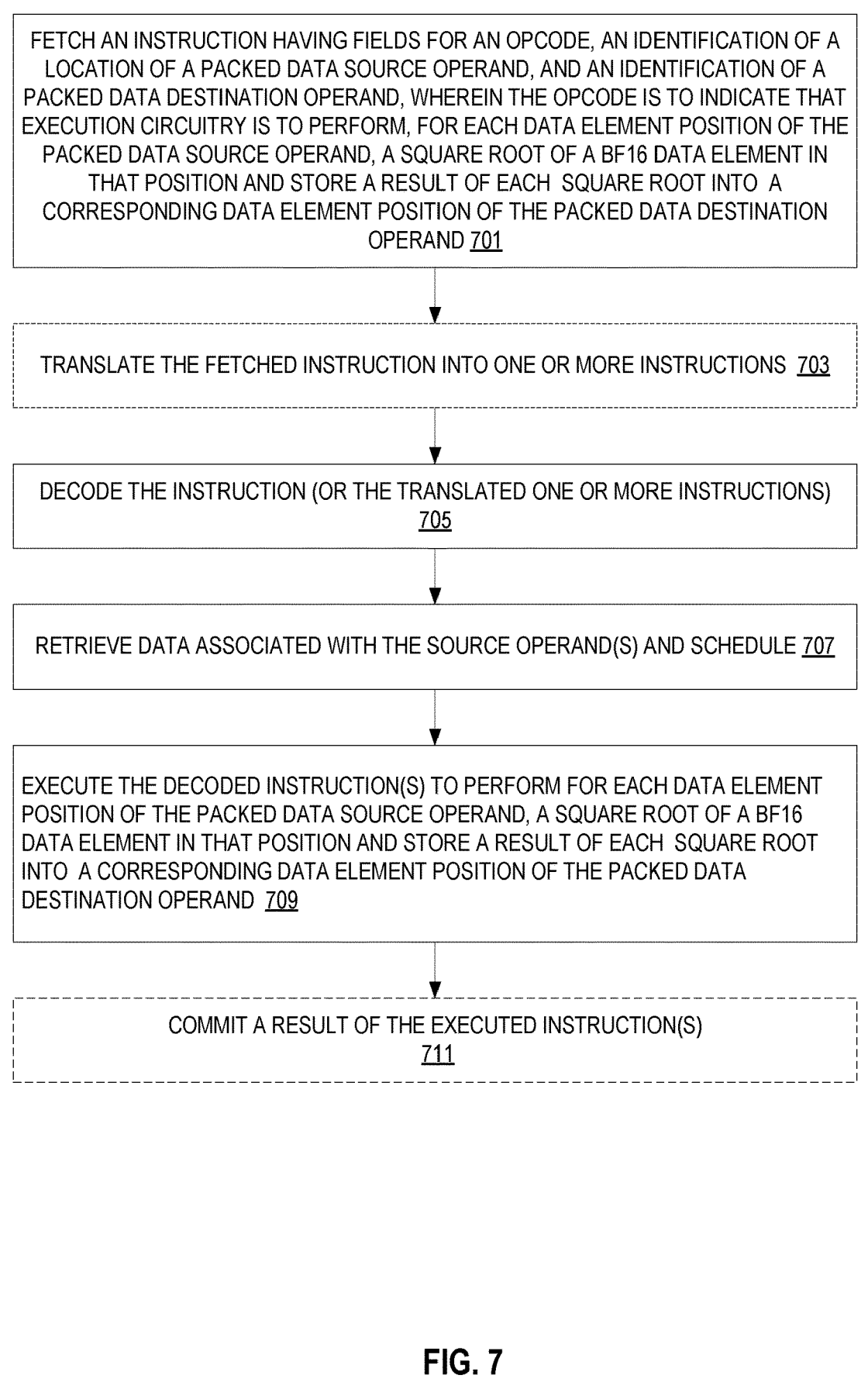

FETCH AN INSTRUCTION HAVING FIELDS FOR AN OPCODE, AN IDENTIFICATION OF A LOCATION OF A PACKED DATA SOURCE OPERAND, AND AN IDENTIFICATION OF A PACKED DATA DESTINATION OPERAND, WHEREIN THE OPCODE IS TO INDICATE THAT EXECUTION CIRCUITRY IS TO PERFORM, FOR EACH DATA ELEMENT POSITION OF THE PACKED DATA SOURCE OPERAND, A SQUARE ROOT OF A BF16 DATA ELEMENT IN THAT POSITION AND STORE A RESULT OF EACH SQUARE ROOT INTO A CORRESPONDING DATA ELEMENT POSITION OF THE PACKED DATA DESTINATION OPERAND 701

TRANSLATE THE FETCHED INSTRUCTION INTO ONE OR MORE INSTRUCTIONS 703

DECODE THE INSTRUCTION (OR THE TRANSLATED ONE OR MORE INSTRUCTIONS) 705

RETRIEVE DATA ASSOCIATED WITH THE SOURCE OPERAND(S) AND SCHEDULE 707

EXECUTE THE DECODED INSTRUCTION(S) TO PERFORM FOR EACH DATA ELEMENT POSITION OF THE PACKED DATA SOURCE OPERAND, A SQUARE ROOT OF A BF16 DATA ELEMENT IN THAT POSITION AND STORE A RESULT OF EACH SQUARE ROOT INTO A CORRESPONDING DATA ELEMENT POSITION OF THE PACKED DATA DESTINATION OPERAND 709

COMMIT A RESULT OF THE EXECUTED INSTRUCTION(S) 711

FIG. 7

```
VRSQRTNEPBF16 dest{k1}, src
{KL, VL} = (8, 128), (16, 256), (32, 512)

FOR j := 0 TO KL-1:
    IF k1[j] OR *no writemask*:
        IF SRC is memory and (EVEX.b == 1):
            tsrc := SRC.bf16[0]
        ELSE:
            tsrc := SRC.bf16[j]
        DEST.bf16[j] := APPROXIMATE(1.0 / SQRT(tsrc)) //DAZ, FTZ, RNE, SAE
    ELSE IF *zeroing*:
        DEST.bf16[j] := 0
    // else dest.bf16[j] remains unchanged

DEST[MAX_VL-1:VL] := 0
```

FIG. 8

REGISTER ARCHITECTURE 1300

Segment Registers 1320

Machine Specific Registers 1335

Instruction Pointer Register(s) 1330

Control Register(s) 1355

Debug Registers 1350

Mem. Management Registers 1365

Machine Check Registers 1360

Writemask/predicate Registers 1315

SCALAR FP REGISTER FILE 1345

Vector/SIMD Registers 1310

General Purpose Registers 1325

Flag Register(s) 1340

BFLOAT16 SQUARE ROOT AND/OR RECIPROCAL SQUARE ROOT INSTRUCTIONS

BACKGROUND

In recent years fused-multiply-add (FMA) units with lower-precision multiplications and higher-precision accumulation have proven useful in machine learning/artificial intelligence applications, most notably in training deep neural networks due to their extreme computational intensity. Compared to classical IEEE-754 32-bit (FP32) and 64-bit (FP64) arithmetic, this reduced precision arithmetic can naturally be sped up disproportional to their shortened width.

BRIEF DESCRIPTION OF DRAWINGS

Various embodiments in accordance with the present disclosure will be described with reference to the drawings, in which:

FIG. 5 illustrates an embodiment of method performed by a processor to process a calculate a square root of BF16 data elements instruction.

FIG. 6 illustrates exemplary embodiments of pseudo code representing the execution and format of a square root of BF16 data elements instruction.

FIG. 7 illustrates an embodiment of method performed by a processor to process a calculate a reciprocal square root of BF16 data elements instruction.

FIG. 8 illustrates exemplary embodiments of pseudo code representing the execution and format of a reciprocal square root of BF16 data elements instruction.

DETAILED DESCRIPTION

The present disclosure relates to methods, apparatus, systems, and non-transitory computer-readable storage media for calculating square roots or reciprocal square roots of BF16 data elements.

Figure 1:
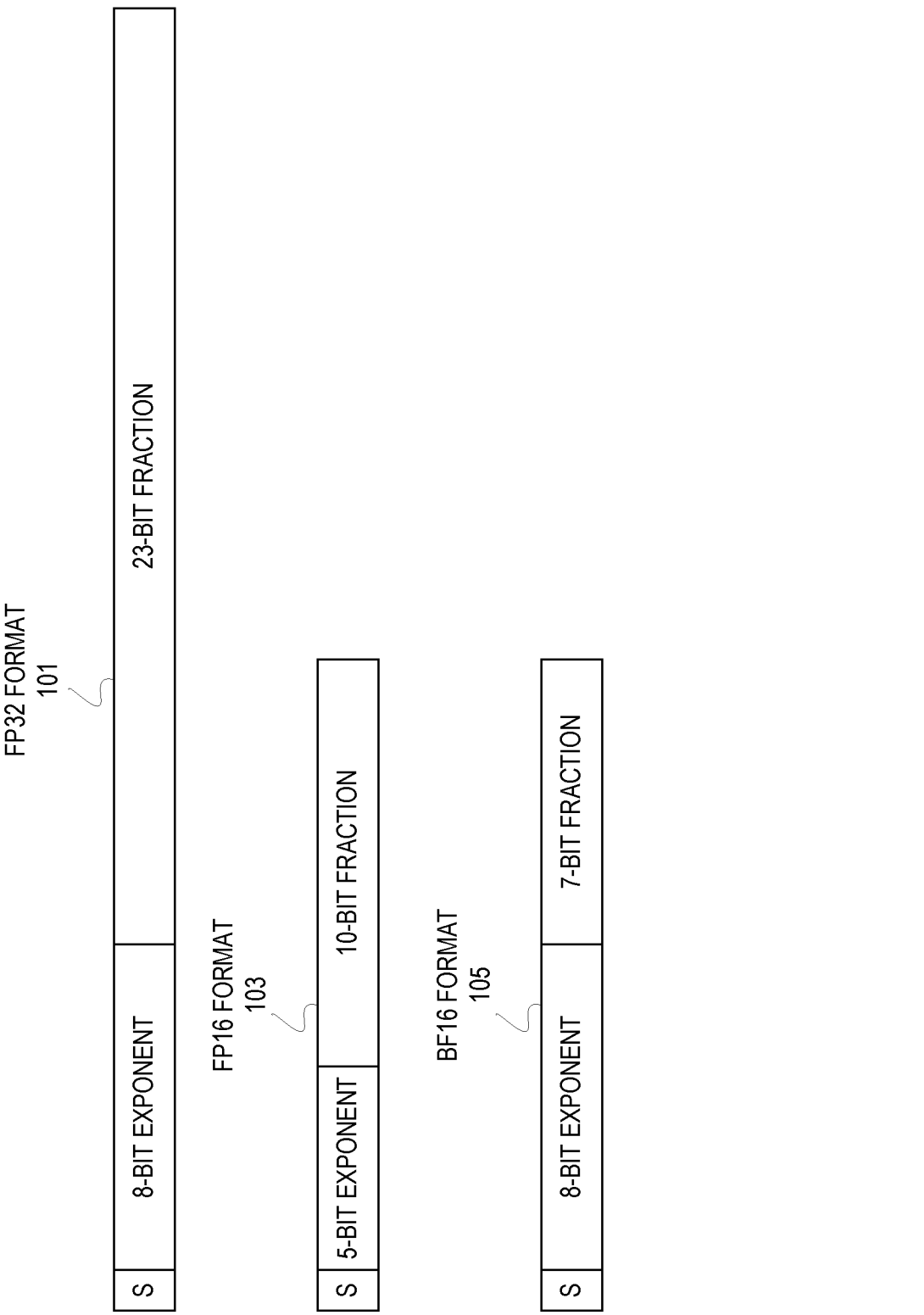
FIG. 1 illustrates different floating point representation formats.

BF16 is gaining traction due to its ability to work well in machine learning algorithms, in particular deep learning training. FIG. 1 illustrates different floating point representation formats. In this illustration, the formats are in little endian format, however, in some embodiments, a big endian format is used. The FP32 format 101 has a sign bit (S), an 8-bit exponent, and a 23-bit fraction (a 24-bit mantissa that uses an implicit bit). The FP16 format 103 has a sign bit (S), a 5-bit exponent, and a 10-bit fraction. The BF16 format 105 has a sign bit (S), an 8-bit exponent, and a 7-bit fraction.

In contrast to the IEEE 754-standardized 16-bit (FP16) variant, BF16 does not compromise on range when being compared to FP32. FP32 numbers have 8 bits of exponent and 24 bits of mantissa (including the one implicit). BF16 cuts 16 bits from the 24-bit FP32 mantissa to create a 16-bit floating point datatype. In contrast FP16, roughly halves the FP32 mantissa to 10 explicit bits and reduces the exponent to 5 bits to fit the 16-bit datatype envelope.

Although BF16 offers less precision than FP16, it is typically better suited to support deep learning tasks. FP16's range is not enough to accomplish deep learning training out-of-the-box due to its limited range. BF16 does not suffer from this issue and the limited precision may actually help to generalize the learned weights in the neural net training task. In other words, lower precision can be seen as offering a built-in regularization property.

Detailed herein are embodiments of instructions, and their support, that operate on BF16 source data elements. In some embodiments, an execution of a single instruction calculates a square root and in some embodiments an execution of a single instruction calculates a reciprocal square root. In some embodiments, the single instruction is translated from a first instruction set architecture (ISA) to one or more instructions of a second ISA and the execution of the one or more instructions of the second ISA perform those calculations.

In some embodiments, one or both of the instruction are defined such as their execution is to treat denormal inputs or outputs as zeros, support any rounding mode, and/or report or suppress floating point numerical flags.

Figure 2:
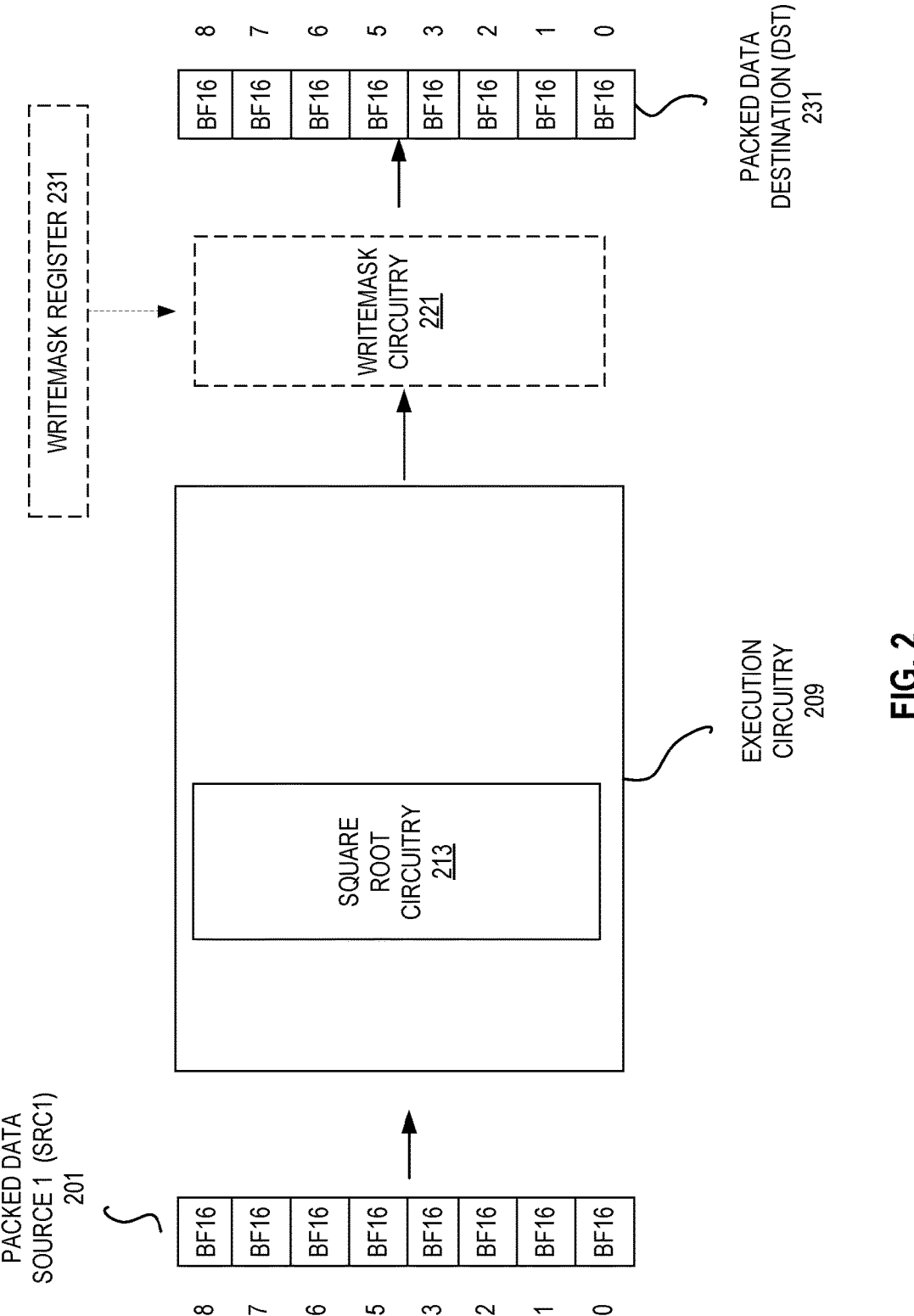
FIG. 2 illustrates an exemplary execution of an instruction to calculate a square root of BF16 data elements.

FIG. 2 illustrates an exemplary execution of an instruction to calculate a square root of BF16 data elements. While this illustration is in little endian format, the principles discussed herein work in big endian format. The square root of BF16 data elements instruction (shown here with an exemplary opcode mnemonic of VSQRTNEPBF16) includes one or more fields to define the opcode for the instruction, one or more fields to reference or indicate a packed data source (e.g., a register or memory location), and/or one or more fields to reference or indicate a packed data destination (e.g., a register or memory location). In some embodiments, the instruction also includes one or more fields to reference or indicate a writemask or predication register that is to store writemask or predicate values as described later.

In this example, the packed data source 201 includes 8 packed data elements each of which is in BF16 format. The packed data source 201 may be a register or a memory location.

The packed data source 201 is fed into execution circuitry 209 to be operated on. In particular, execution circuitry 209 performs a calculation of a square root for each of the packed data elements. In this illustration, each of the BF16 data elements from the packed data source 201 has a square root calculated for the by square root circuitry 213. In some embodiments, this execution of the instruction uses a round to nearest (even) rounding mode. In some embodiments, output denormals are always flushed to zero and input denormals are always treated as zero.

The packed data destination 231 is written to store the resultant BF16-formated square roots in corresponding packed data elements as the packed data source 201. In some embodiments, when the instruction calls for the use of predication or writemasking, a writemask (or predicate) register 231 dictates how the resultant BF16-formated square roots are stored and/or zeroed using the writemask circuitry 221.

Figure 3:
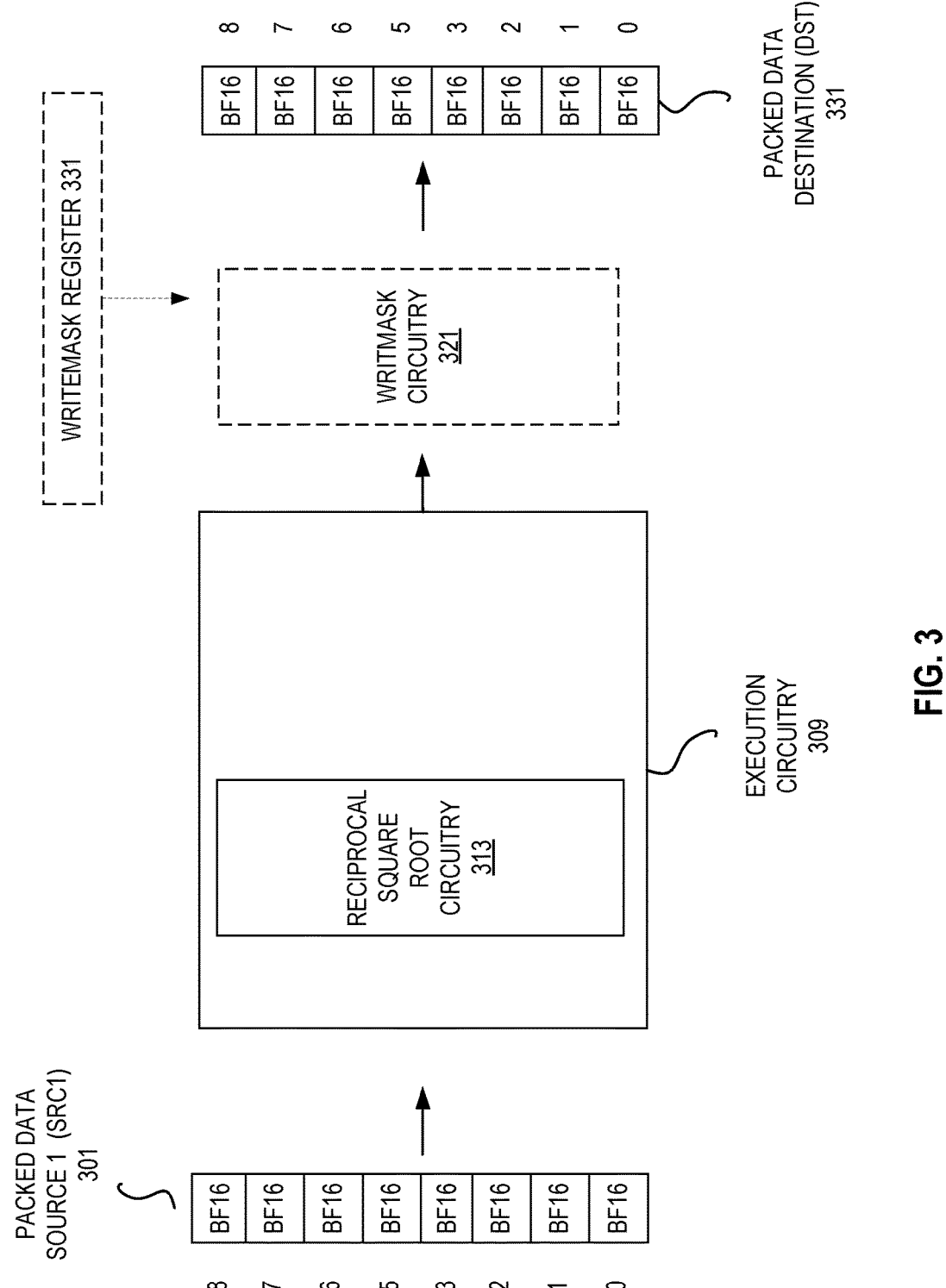
FIG. 3 illustrates an exemplary execution of an instruction to calculate a reciprocal square root of BF16 data elements.

FIG. 3 illustrates an exemplary execution of an instruction to calculate a reciprocal square root of BF16 data elements. While this illustration is in little endian format, the principles discussed herein work in big endian format. The reciprocal square root of BF16 data elements instruction (shown here with an exemplary opcode mnemonic of VSQRTNEPBF16) includes one or more fields to define the opcode for the instruction, one or more fields to reference or indicate a packed data source (e.g., a register or memory location), and/or one or more fields to reference or indicate a packed data destination (e.g., a register or memory location). In some embodiments, the instruction also includes one or more fields to reference or indicate a writemask or predication register that is to store writemask or predicate values as described later.

In this example, the packed data source 301 includes 8 packed data elements each of which is in BF16 format. The packed data source 301 may be a register or a memory location.

The packed data source 301 is fed into execution circuitry 309 to be operated on. In particular, execution circuitry 309 performs a calculation of a reciprocal square root for each of the packed data elements. In this illustration, each of the BF16 data elements has a reciprocal square root calculated by reciprocal square root circuitry 313. In some embodiments, this execution of the instruction uses a round to nearest (even) rounding mode. In some embodiments, output denormals are always flushed to zero and input denormals are always treated as zero.

The packed data destination 331 is written to store the resultant BF16-formated reciprocal square roots in corresponding packed data elements as the packed data source 301.

In some embodiments, when the instruction calls for the use of predication or writemasking, a writemask (or predicate) register 331 dictates how the resultant BF16-formated reciprocal square roots are stored and/or zeroed using the writemask circuitry 321.

Figure 4:
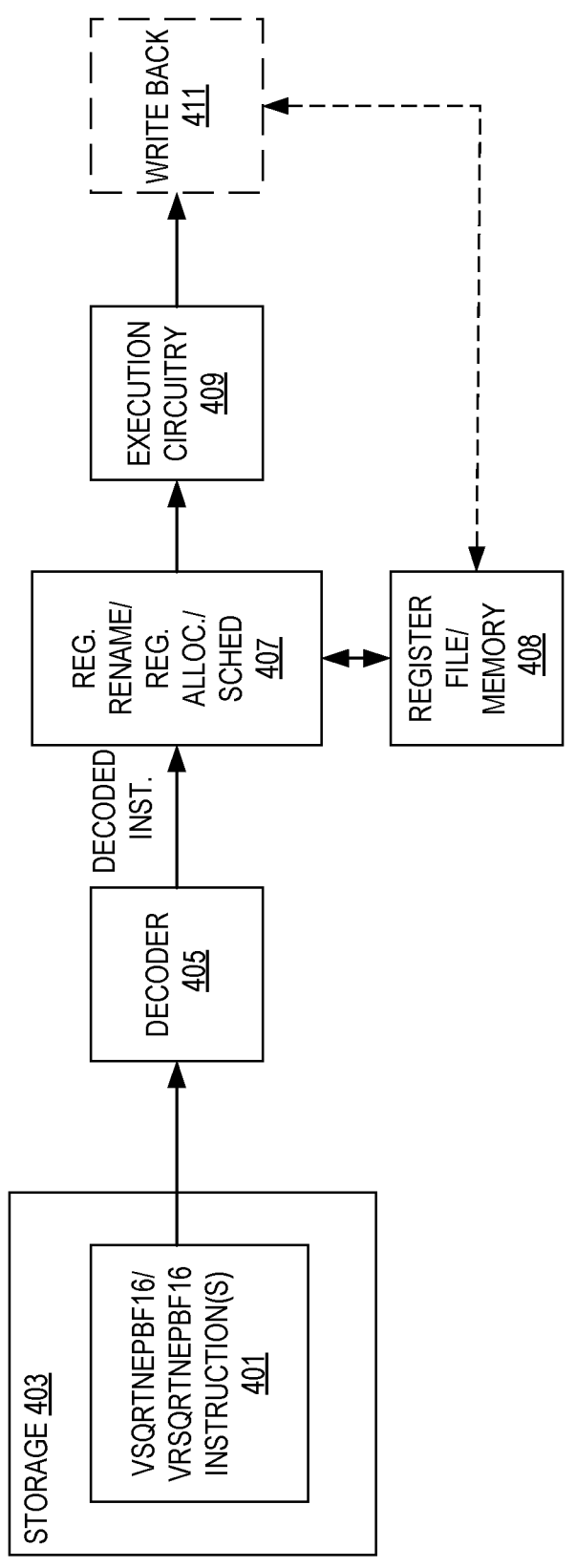
FIG. 4 illustrates embodiments of hardware to process an instruction such as the VSQRTNEPBF16 and/or VRSQRT-NEPBF16 instructions.

FIG. 4 illustrates embodiments of hardware to process an instruction such as the VSQRTNEPBF16 and/or VRSQRTNEPBF16 instructions. As illustrated, storage 403 stores a VSQRTNEPBF16 and/or VRSQRTNEPBF16 instruction 401 to be executed.

The instruction 401 is received by decode circuitry 405. For example, the decode circuitry 405 receives this instruction from fetch logic/circuitry. The instruction includes fields for an opcode, first and second sources, and a destination. In some embodiments, the sources and destination are registers, and in other embodiments one or more are memory locations. In some embodiments, the opcode details which arithmetic operation is to be performed.

More detailed embodiments of at least one instruction format will be detailed later. The decode circuitry 405 decodes the instruction into one or more operations. In some embodiments, this decoding includes generating a plurality of micro-operations to be performed by execution circuitry (such as execution circuitry 409). The decode circuitry 405 also decodes instruction prefixes.

In some embodiments, register renaming, register allocation, and/or scheduling circuitry 407 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 408 store data as operands of the instruction to be operated on by execution circuitry 409. Exemplary register types include packed data registers, general purpose registers, and floating-point registers.

Execution circuitry 409 executes the decoded instruction. Exemplary detailed execution circuitry is shown in FIGS. 2, 11, etc. The execution of the decoded instruction causes the execution circuitry to either a calculation of a square root of BF16 data elements or a calculation of a reciprocal square root of BF16 data elements of the source operand and stores the result in a destination register or memory location.

In some embodiments, retirement/write back circuitry 411 architecturally commits the result 408 and retires the instruction.

An embodiment of a format for a calculate a square root of BF16 data elements instruction is VSQRTNEPBF16 DST{k}, SRC. In some embodiments, VSQRTNEPBF16 is the opcode mnemonic of the instruction. DST is a field for the packed data destination register operand. SRC is one or more fields for the source such as packed data register and/or memory. The source operand and destination operand may come in one or more sizes such as 128-bit, 256-bit, 512-bit, etc. The {k} is used when writemasking or predication is used.

An embodiment of a format for a calculate a reciprocal square root of BF16 data elements instruction is VRSQRTNEPBF16 DST{k}, SRC. In some embodiments, VRSQRTNEPBF16 is the opcode mnemonic of the instruction. DST is a field for the packed data destination register operand. SRC is one or more fields for the source such as packed data register and/or memory. The source operand and destination operand may come in one or more sizes such as 128-bit, 256-bit, 512-bit, etc. The {k} is used when writemasking or predication is used.

FIG. 5 illustrates an embodiment of method performed by a processor to process a calculate a square root of BF16 data elements instruction. For example, a processor core as shown in FIG. 11(B), a pipeline as detailed below, etc. performs this method.

At 501 an instruction is fetched having fields for an opcode, an identification of a location of a packed data source operand, and an identification of a packed data destination operand, wherein the opcode is to indicate that execution circuitry is to perform, for each data element position of the packed data source operand, a square root of a BF16 data element in that position and store a result of each square root into a corresponding data element position of the packed data destination operand.

In some embodiments, the fetched instruction, of a first ISA, is translated into one or more instructions of a second, different ISA at 503. The one or more instructions of the second, different ISA, when executed, provided the same result as if the fetched instruction had been executed. Note the translation may be performed by hardware, software, or a combination thereof.

The instruction (or the translated one or more instructions) is/are decoded 505. This decoding may cause the generation of one or more micro-operations to be performed. Note that as this instruction Data values associated with the source operand of the decoded instruction are retrieved at 507. For example, when a source operand is stored in memory, the data from the indicated memory location is retrieved.

At 509, the decoded instruction(s) is/are executed by execution circuitry (hardware) such as that detailed herein. The execution circuitry is to perform for each data element position of the packed data source operand, a square root of a BF16 data element in that position and store a result of each square root into a corresponding data element position of the packed data destination operand. No conversion is required and native BF16 square root circuitry is used.

In some embodiments, the instruction is committed or retired at 511.

FIG. 6 illustrates exemplary embodiments of pseudo code representing the execution and format of a square root of BF16 data elements instruction. Note that EVEX.b maps to the b of prefix 1401(C). The comment of DAZ, FTZ, RNE, and SAE refer to the use of support for flush-to-zero (FTZ), denormals-are-zero (DAZ), suppress all exceptions (SAE), and round-to-even (RNE) rounding.

FIG. 7 illustrates an embodiment of method performed by a processor to process a calculate a reciprocal square root of BF16 data elements instruction. For example, a processor core as shown in FIG. 11(B), a pipeline as detailed below, etc. performs this method.

At 701 an instruction is fetched having fields for an opcode, an identification of a location of a packed data source operand, and an identification of a packed data destination operand, wherein the opcode is to indicate that execution circuitry is to perform, for each data element position of the packed data source operand, a reciprocal square root of a BF16 data element in that position and store a result of each reciprocal square root into a corresponding data element position of the packed data destination operand.

In some embodiments, the fetched instruction, of a first ISA, is translated into one or more instructions of a second, different ISA at 703. The one or more instructions of the second, different ISA, when executed, provided the same result as if the fetched instruction had been executed. Note the translation may be performed by hardware, software, or a combination thereof.

The instruction (or the translated one or more instructions) is/are decoded 705. This decoding may cause the generation of one or more micro-operations to be performed. Note that as this instruction Data values associated with the source operand of the decoded instruction are retrieved at 707. For example, when a source operand is stored in memory, the data from the indicated memory location is retrieved.

At 709, the decoded instruction(s) is/are executed by execution circuitry (hardware) such as that detailed herein. The execution circuitry is to perform for each data element position of the packed data source operand, a reciprocal square root of a BF16 data element in that position and store a result of each reciprocal square root into a corresponding data element position of the packed data destination operand. No conversion is required and native BF16 reciprocal square root circuitry is used.

In some embodiments, the instruction is committed or retired at 711.

FIG. 8 illustrates exemplary embodiments of pseudo code representing the execution and format of a reciprocal square root of BF16 data elements instruction. Note that EVEX.b maps to the b of prefix 1401(C). The comment of DAZ, FTZ, RNE, and SAE refers to the use of support for flush-to-zero (FTZ), denormals-are-zero (DAZ), suppress all exceptions (SAE), and round-to-even (RNE) rounding.

Exemplary Computer Architectures

Detailed below are describes of exemplary computer architectures, instruction formats, etc. that support the above detailed instructions. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 9:
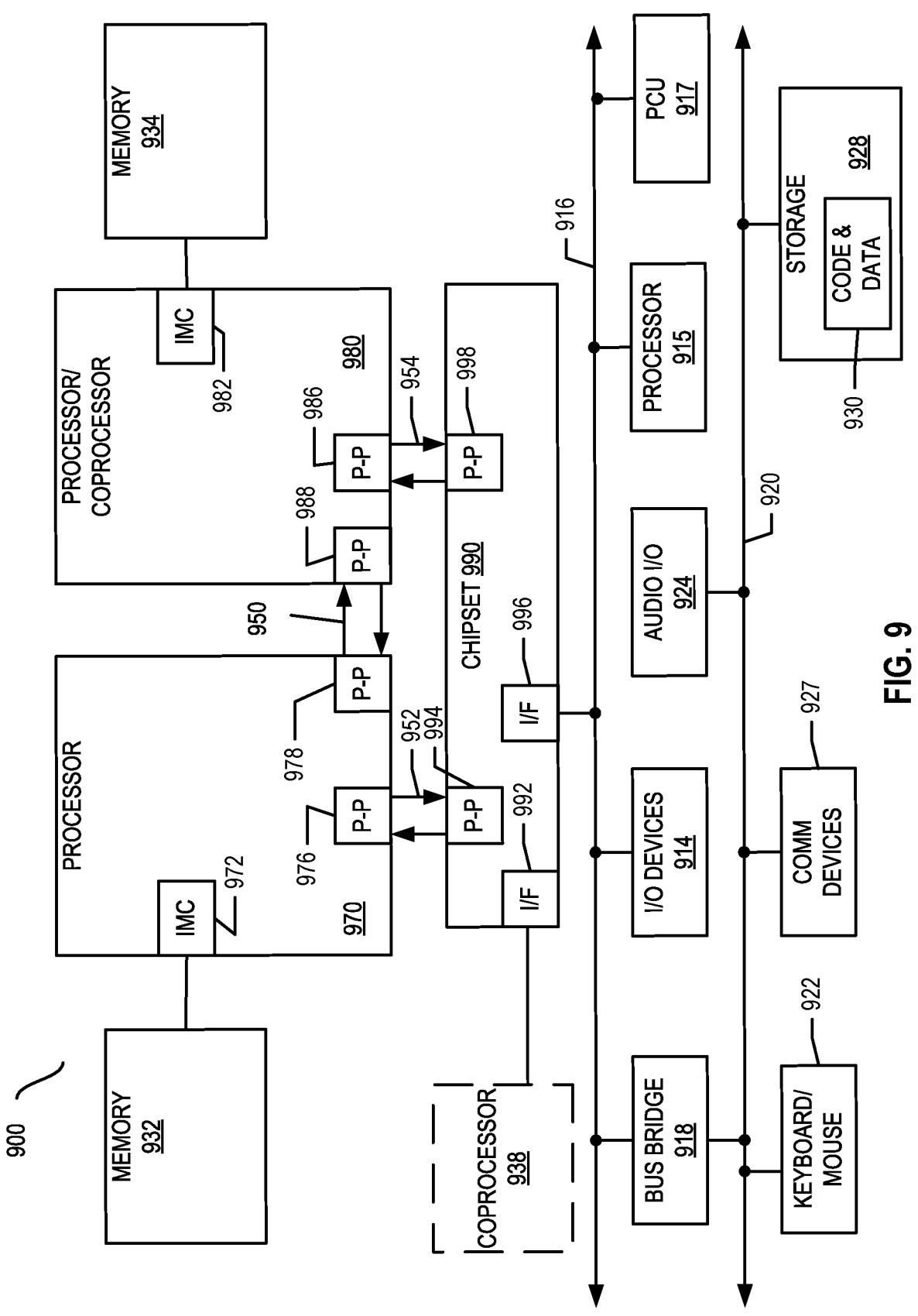
FIG. 9 illustrates embodiments of an exemplary system.

FIG. 9 illustrates embodiments of an exemplary system. Multiprocessor system 900 is a point-to-point interconnect system and includes a plurality of processors including a first processor 970 and a second processor 980 coupled via a point-to-point interconnect 950. In some embodiments, the first processor 970 and the second processor 980 are homogeneous. In some embodiments, first processor 970 and the second processor 980 are heterogenous.

Processors 970 and 980 are shown including integrated memory controller (IMC) units circuitry 972 and 982, respectively. Processor 970 also includes as part of its interconnect controller units point-to-point (P-P) interfaces 976 and 978; similarly, second processor 980 includes P-P interfaces 986 and 988. Processors 970, 980 may exchange information via the point-to-point (P-P) interconnect 950 using P-P interface circuits 978, 988. IMCs 972 and 982 couple the processors 970, 980 to respective memories, namely a memory 932 and a memory 934, which may be portions of main memory locally attached to the respective processors.

Processors 970, 980 may each exchange information with a chipset 990 via individual P-P interconnects 952, 954 using point to point interface circuits 976, 994, 986, 998. Chipset 990 may optionally exchange information with a coprocessor 938 via a high-performance interface 992. In some embodiments, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor 970, 980 or outside of both processors, yet connected with the processors via P-P interconnect, such that either or both processors' local cache information may be stored in the shared cache if a processor is placed into a low power mode.

Chipset 990 may be coupled to a first interconnect 916 via an interface 996. In some embodiments, first interconnect 916 may be a Peripheral Component Interconnect (PCI) interconnect, or an interconnect such as a PCI Express interconnect or another I/O interconnect. In some embodiments, one of the interconnects couples to a power control unit (PCU) 917, which may include circuitry, software, and/or firmware to perform power management operations with regard to the processors 970, 980 and/or co-processor 938. PCU 917 provides control information to a voltage regulator to cause the voltage regulator to generate the appropriate regulated voltage. PCU 917 also provides control information to control the operating voltage generated. In various embodiments, PCU 917 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 917 is illustrated as being present as logic separate from the processor 970 and/or processor 980. In other cases, PCU 917 may execute on a given one or more of cores (not shown) of processor 970 or 980. In some cases, PCU 917 may be implemented as a microcontroller (dedicated or general-purpose) or other control logic configured to execute its own dedicated power management code, sometimes referred to as P-code. In yet other embodiments, power management operations to be performed by PCU 917 may be implemented externally to a processor, such as by way of a separate power management integrated circuit (PMIC) or another component external to the processor. In yet other embodiments, power management operations to be performed by PCU 917 may be implemented within BIOS or other system software.

Various I/O devices 914 may be coupled to first interconnect 916, along with an interconnect (bus) bridge 918 which couples first interconnect 916 to a second interconnect 920. In some embodiments, one or more additional processor(s) 915, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 916. In some embodiments, second interconnect 920 may be a low pin count (LPC) interconnect. Various devices may be coupled to second interconnect 920 including, for example, a keyboard and/or mouse 922, communication devices 927 and a storage unit circuitry 928. Storage unit circuitry 928 may be a disk drive or other mass storage device which may include instructions/code and data 930, in some embodiments. Further, an audio I/O 924 may be coupled to second interconnect 920. Note that other architectures than the point-to-point architecture described above are possible. For example, instead of the point-to-point architecture, a system such as multiprocessor system 900 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 10:
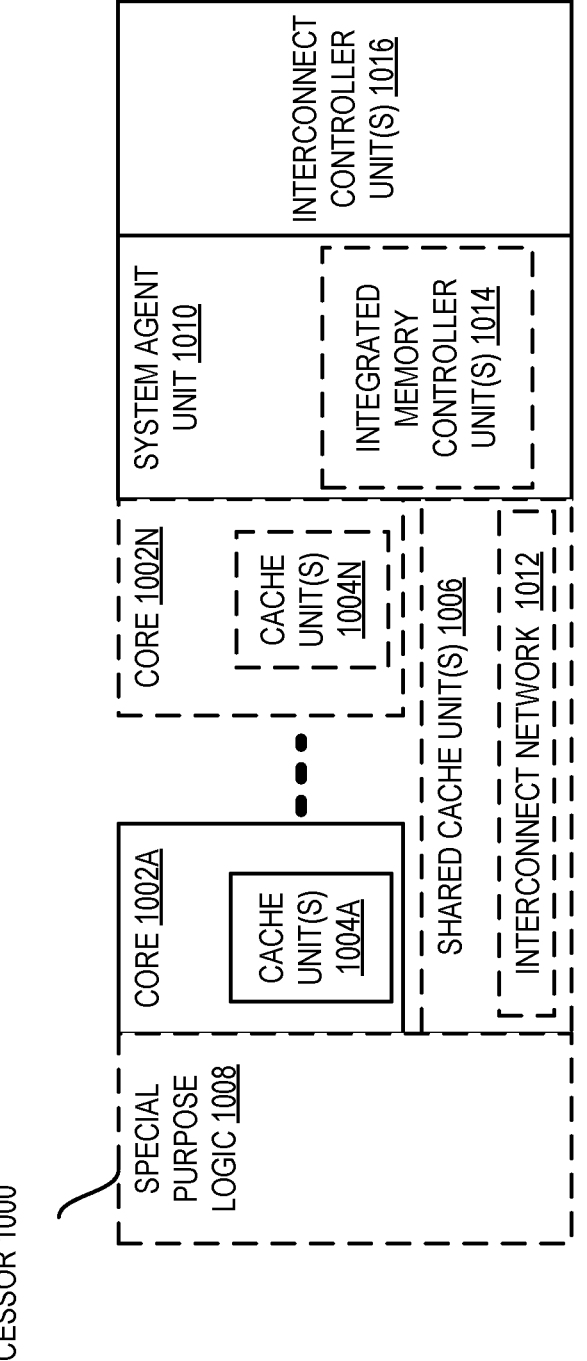
FIG. 10 illustrates a block diagram of embodiments of a processor that may have more than one core, may have an integrated memory controller, and may have integrated graphics.

FIG. 10 illustrates a block diagram of embodiments of a processor 1000 that may have more than one core, may have an integrated memory controller, and may have integrated graphics. The solid lined boxes illustrate a processor 1000 with a single core 1002A, a system agent 1010, a set of one or more interconnect controller units circuitry 1016, while the optional addition of the dashed lined boxes illustrates an alternative processor 1000 with multiple cores 1002(A)-(N), a set of one or more integrated memory controller unit(s) circuitry 1014 in the system agent unit circuitry 1010, and special purpose logic 1008, as well as a set of one or more interconnect controller units circuitry 1016. Note that the processor 1000 may be one of the processors 970 or 980, or co-processor 938 or 915 of FIG. 9.

Thus, different implementations of the processor 1000 may include: 1) a CPU with the special purpose logic 1008 being integrated graphics and/or scientific (throughput) logic (which may include one or more cores, not shown), and the cores 1002(A)-(N) being one or more general purpose cores (e.g., general purpose in-order cores, general purpose out-of-order cores, or a combination of the two); 2) a coprocessor with the cores 1002(A)-(N) being a large number of special purpose cores intended primarily for graphics and/or scientific (throughput); and 3) a coprocessor with the cores 1002(A)-(N) being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

A memory hierarchy includes one or more levels of cache unit(s) circuitry 1004(A)-(N) within the cores 1002(A)-(N), a set of one or more shared cache units circuitry 1006, and external memory (not shown) coupled to the set of integrated memory controller units circuitry 1014. The set of one or more shared cache units circuitry 1006 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 1012 interconnects the special purpose logic 1008 (e.g., integrated graphics logic), the set of shared cache units circuitry 1006, and the system agent unit circuitry 1010, alternative embodiments use any number of well-known techniques for interconnecting such units. In some embodiments, coherency is maintained between one or more of the shared cache units circuitry 1006 and cores 1002(A)-(N).

In some embodiments, one or more of the cores 1002(A)-(N) are capable of multi-threading. The system agent unit circuitry 1010 includes those components coordinating and operating cores 1002(A)-(N). The system agent unit circuitry 1010 may include, for example, power control unit (PCU) circuitry and/or display unit circuitry (not shown). The PCU may be or may include logic and components needed for regulating the power state of the cores 1002(A)-(N) and/or the special purpose logic 1008 (e.g., integrated graphics logic). The display unit circuitry is for driving one or more externally connected displays.

The cores 1002(A)-(N) may be homogenous or heterogeneous in terms of architecture instruction set; that is, two or more of the cores 1002(A)-(N) may be capable of executing the same instruction set, while other cores may be capable of executing only a subset of that instruction set or a different instruction set.

Exemplary Core Architectures

In-Order and Out-of-Order Core Block Diagram

Figure 11A:
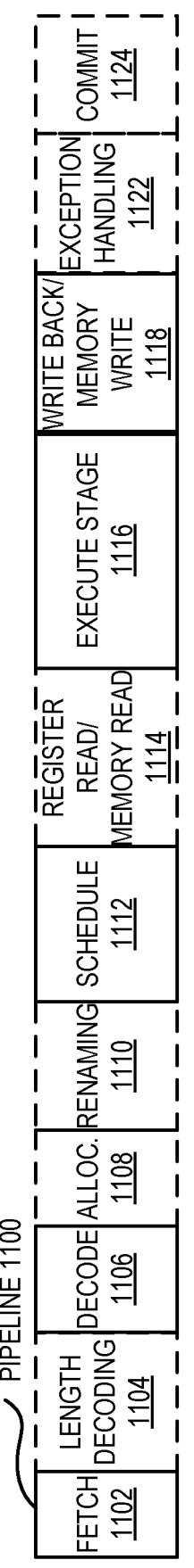
FIG. 11(A) is a block diagram illustrating both an exemplary in-order pipeline and an exemplary register renaming, out-of-order issue/execution pipeline according to embodiments of the invention.
Figure 11B:
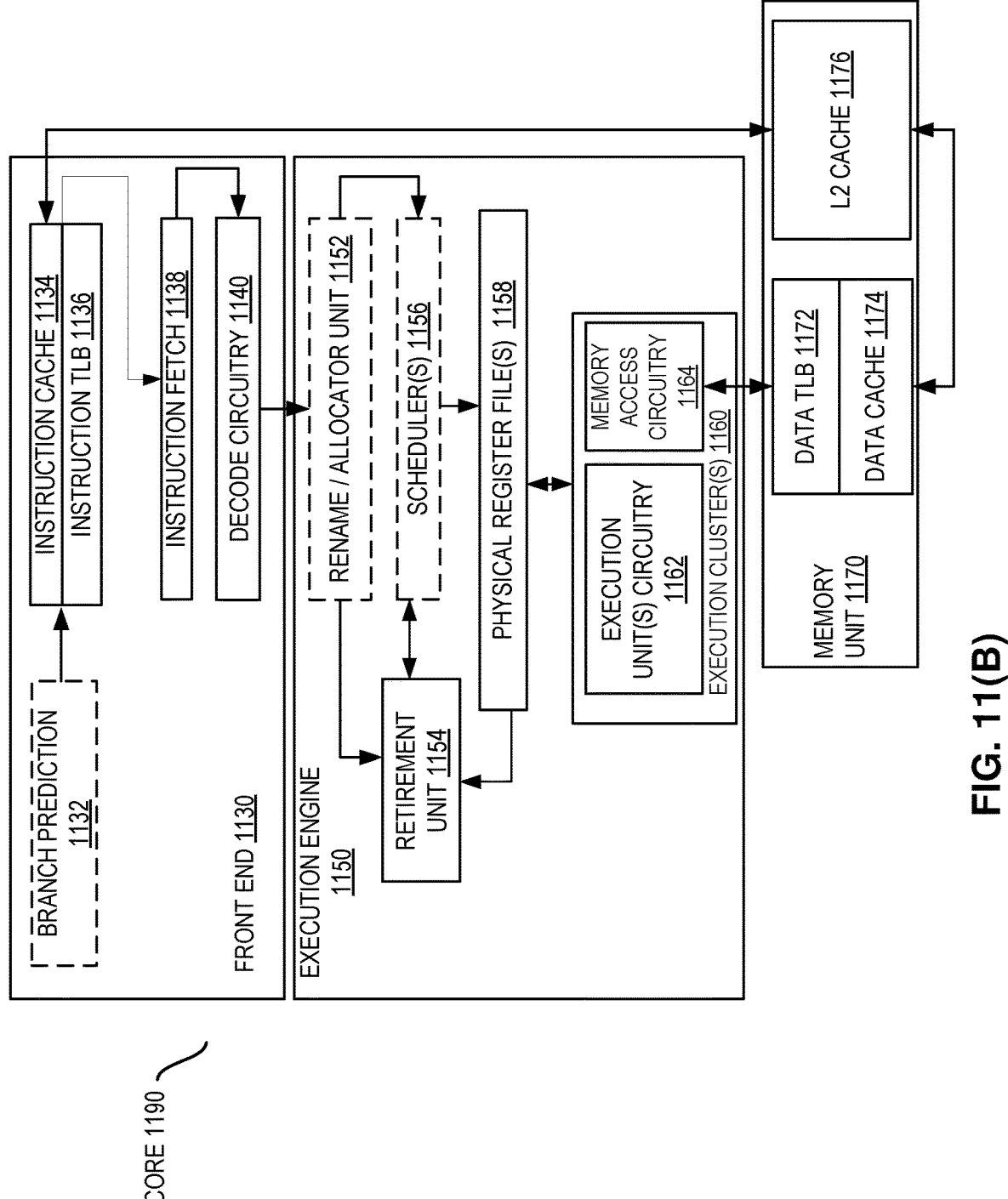
FIG. 11(B) is a block diagram illustrating both an exemplary embodiment of an in-order architecture core and an exemplary register renaming, out-of-order issue/execution architecture core to be included in a processor according to embodiments of the invention.

FIG. 11(A) is a block diagram illustrating both an exemplary in-order pipeline and an exemplary register renaming, out-of-order issue/execution pipeline according to embodiments of the invention. FIG. 11(B) is a block diagram illustrating both an exemplary embodiment of an in-order architecture core and an exemplary register renaming, out-of-order issue/execution architecture core to be included in a processor according to embodiments of the invention. The solid lined boxes in FIGS. 11(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11(A), a processor pipeline 1100 includes a fetch stage 1102, an optional length decode stage 1104, a decode stage 1106, an optional allocation stage 1108, an optional renaming stage 1110, a scheduling (also known as a dispatch or issue) stage 1112, an optional register read/memory read stage 1114, an execute stage 1116, a write back/memory write stage 1118, an optional exception handling stage 1122, and an optional commit stage 1124. One or more operations can be performed in each of these processor pipeline stages. For example, during the fetch stage 1102, one or more instructions are fetched from instruction memory, during the decode stage 1106, the one or more fetched instructions may be decoded, addresses (e.g., load store unit (LSU) addresses) using forwarded register ports may be generated, and branch forwarding (e.g., immediate offset or an link register (LR)) may be performed. In one embodiment, the decode stage 1106 and the register read/memory read stage 1114 may be combined into one pipeline stage. In one embodiment, during the execute stage 1116, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit circuitry 1140 performs the decode stage 1106; 3) the rename/allocator unit circuitry 1152 performs the allocation stage 1108 and renaming stage 1110; 4) the scheduler unit(s) circuitry 1156 performs the schedule stage 1112; 5) the physical register file(s) unit(s) circuitry 1158 and the memory unit circuitry 1170 perform the register read/memory read stage 1114; the execution cluster 1160 perform the execute stage 1116; 6) the memory unit circuitry 1170 and the physical register file(s) unit(s) circuitry 1158 perform the write back/memory write stage 1118; 7) various units (unit circuitry) may be involved in the exception handling stage 1122; and 8) the retirement unit circuitry 1154 and the physical register file(s) unit(s) circuitry 1158 perform the commit stage 1124.

FIG. 11(B) shows processor core 1190 including front-end unit circuitry 1130 coupled to an execution engine unit circuitry 1150, and both are coupled to a memory unit circuitry 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit circuitry 1130 may include branch prediction unit circuitry 1132 coupled to an instruction cache unit circuitry 1134, which is coupled to an instruction translation lookaside buffer (TLB) 1136, which is coupled to instruction fetch unit circuitry 1138, which is coupled to decode unit circuitry 1140. In one embodiment, the instruction cache unit circuitry 1134 is included in the memory unit circuitry 1170 rather than the front-end unit circuitry 1130. The decode unit circuitry 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 1140 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM (not shown) or other medium that stores microcode for certain macroinstructions (e.g., in decode unit circuitry 1140 or otherwise within the front end unit circuitry 1130). In one embodiment, the decode unit circuitry 1140 includes a micro-operation (micro-op) or operation cache (not shown) to hold/cache decoded operations, micro-tags, or micro-operations generated during the decode or other stages of the processor pipeline 1100. The decode unit circuitry 1140 may be coupled to rename/allocator unit circuitry 1152 in the execution engine unit circuitry 1150.

The execution engine circuitry 1150 includes the rename/allocator unit circuitry 1152 coupled to a retirement unit circuitry 1154 and a set of one or more scheduler(s) circuitry 1156. The scheduler(s) circuitry 1156 represents any number of different schedulers, including reservations stations, central instruction window, etc. In some embodiments, the scheduler(s) circuitry 1156 can include arithmetic logic unit (ALU) scheduler/scheduling circuitry, ALU queues, arithmetic generation unit (AGU) scheduler/scheduling circuitry, AGU queues, etc. The scheduler(s) circuitry 1156 is coupled to the physical register file(s) circuitry 1158. Each of the physical register file(s) circuitry 1158 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit circuitry 1158 includes vector registers unit circuitry, writemask registers unit circuitry, and scalar register unit circuitry. These register units may provide architectural vector registers, vector mask registers, general-purpose registers, etc. The physical register file(s) unit(s) circuitry 1158 is overlapped by the retirement unit circuitry 1154 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1154 and the physical register file(s) circuitry 1158 are coupled to the execution cluster(s) 1160. The execution cluster(s) 1160 includes a set of one or more execution units circuitry 1162 and a set of one or more memory access circuitry 1164. The execution units circuitry 1162 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 1156, physical register file(s) unit(s) circuitry 1158, and execution cluster(s) 1160 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 1164). It should also be understood that where separate pipelines are used, one or more of these pipelines may be out-of-order issue/execution and the rest in-order.

In some embodiments, the execution engine unit circuitry 1150 may perform load store unit (LSU) address/data pipelining to an Advanced Microcontroller Bus (AHB) interface (not shown), and address phase and writeback, data phase load, store, and branches.

The set of memory access circuitry 1164 is coupled to the memory unit circuitry 1170, which includes data TLB unit circuitry 1172 coupled to a data cache circuitry 1174 coupled to a level 2 (L2) cache circuitry 1176. In one exemplary embodiment, the memory access units circuitry 1164 may include a load unit circuitry, a store address unit circuit, and a store data unit circuitry, each of which is coupled to the data TLB circuitry 1172 in the memory unit circuitry 1170. The instruction cache circuitry 1134 is further coupled to a level 2 (L2) cache unit circuitry 1176 in the memory unit circuitry 1170. In one embodiment, the instruction cache 1134 and the data cache 1174 are combined into a single instruction and data cache (not shown) in L2 cache unit circuitry 1176, a level 3 (L3) cache unit circuitry (not shown), and/or main memory. The L2 cache unit circuitry 1176 is coupled to one or more other levels of cache and eventually to a main memory.

The core 1190 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the core 1190 includes logic to support a packed data instruction set extension (e.g., AVX1, AVX2), thereby allowing the operations used by many multimedia applications to be performed using packed data.

Exemplary Execution Unit(s) Circuitry

Figure 12:
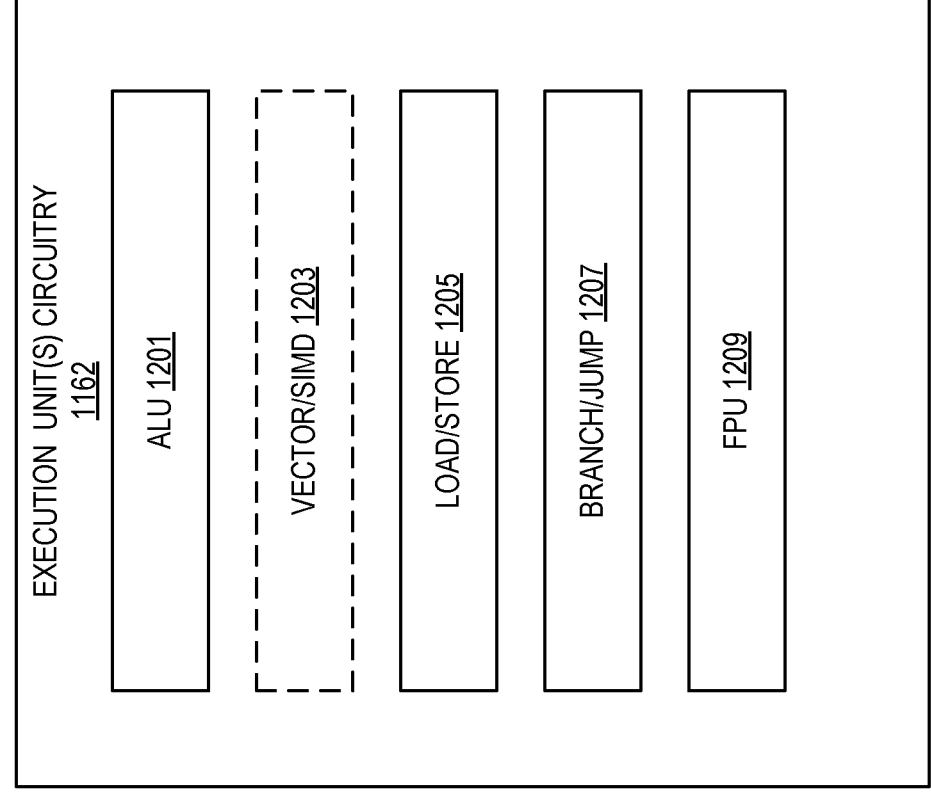
FIG. 12 illustrates embodiments of execution unit(s) circuitry, such as execution unit(s) circuitry of FIG. 11(B).

FIG. 12 illustrates embodiments of execution unit(s) circuitry, such as execution unit(s) circuitry 1162 of FIG. 11(B). As illustrated, execution unit(s) circuitry 1162 may include one or more ALU circuits 1201, vector/SIMD unit circuits 1203, load/store unit circuits 1205, and/or branch/jump unit circuits 1207. ALU circuits 1201 perform integer arithmetic and/or Boolean operations. Vector/SIMD unit circuits 1203 perform vector/SIMD operations on packed data (such as SIMD/vector registers). Load/store unit circuits 1205 execute load and store instructions to load data from memory into registers or store from registers to memory. Load/store unit circuits 1205 may also generate addresses. Branch/jump unit circuits 1207 cause a branch or jump to a memory address depending on the instruction. Floating-point unit (FPU) circuits 1209 perform floating-point arithmetic. The width of the execution unit(s) circuitry 1162 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).

Exemplary Register Architecture

Figure 13:
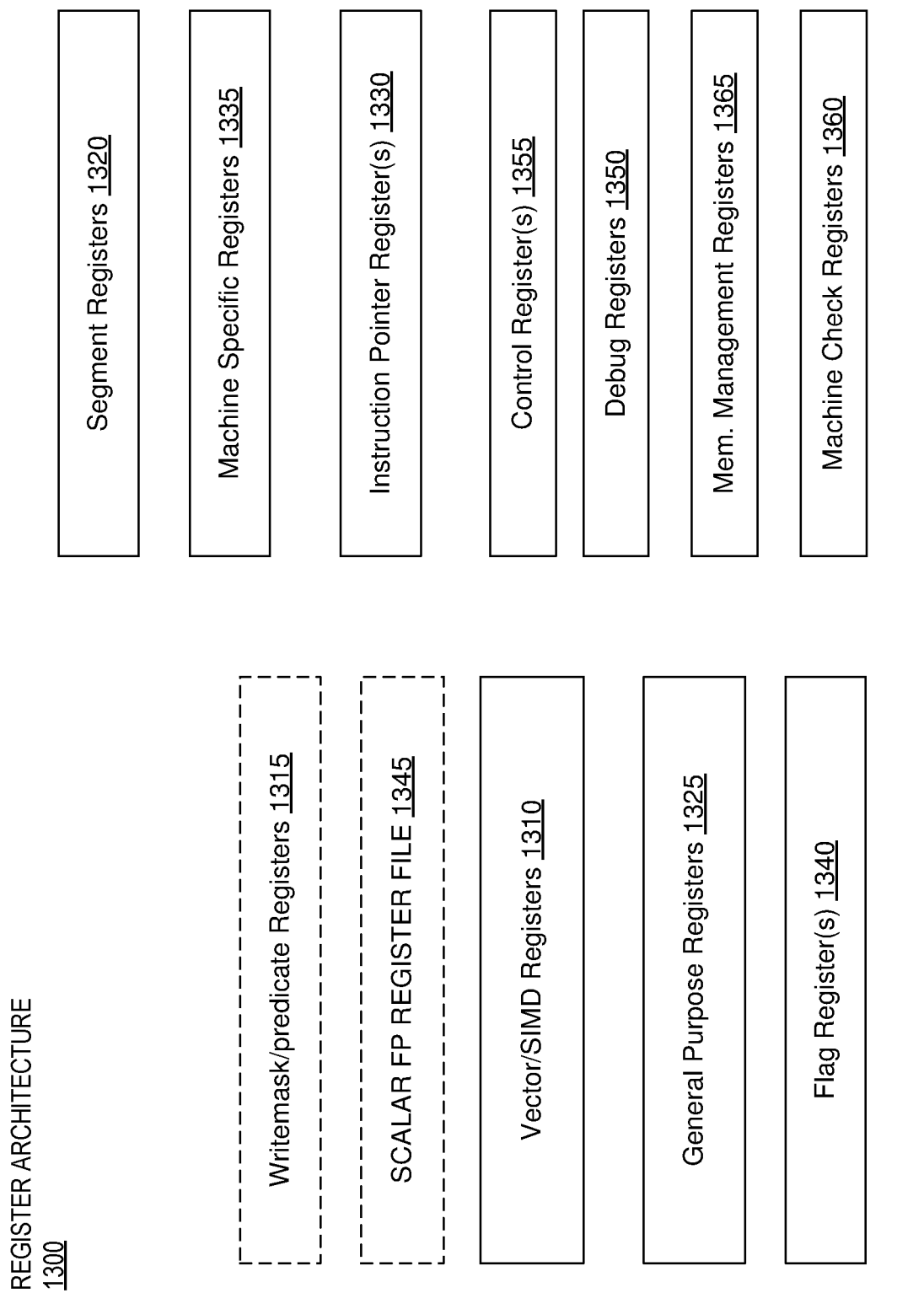
FIG. 13 is a block diagram of a register architecture according to some embodiments.

FIG. 13 is a block diagram of a register architecture 1300 according to some embodiments. As illustrated, there are vector/SIMD registers 1310 that vary from 128-bit to 1,024 bits width. In some embodiments, the vector/SIMD registers 1310 are physically 512-bits and, depending upon the mapping, only some of the lower bits are used. For example, in some embodiments, the vector/SIMD registers 1310 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 1300 includes writemask/predicate registers 1315. For example, in some embodiments, there are 8 writemask/predicate registers (sometimes called k0 through k7) that are each 16-bit, 32-bit, 64-bit, or 128-bit in size. Writemask/predicate registers 1315 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 1315 corresponds to a data element position of the destination. In other embodiments, the writemask/predicate registers 1315 are scalable and consists of a set number of enable bits for a given vector element (e.g., 8 enable bits per 64-bit vector element).

The register architecture 1300 includes a plurality of general-purpose registers 1325. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 1300 includes scalar floating-point register 1345 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 1340 (e.g., EFLAGS, RFLAGS, etc.) store status and control information for arithmetic, compare, and system operations. For example, the one or more flag registers 1340 may store condition code information such as carry, parity, auxiliary carry, zero, sign, and overflow. In some embodiments, the one or more flag registers 1340 are called program status and control registers.

Segment registers 1320 contain segment points for use in accessing memory. In some embodiments, these registers are referenced by the names CS, DS, SS, ES, FS, and GS.

Machine specific registers (MSRs) 1335 control and report on processor performance. Most MSRs 1335 handle system-related functions and are not accessible to an application program. Machine check registers 1360 consist of control, status, and error reporting MSRs that are used to detect and report on hardware errors.

One or more instruction pointer register(s) 1330 store an instruction pointer value. Control register(s) 1355 (e.g., CR0-CR4) determine the operating mode of a processor (e.g., processor 970, 980, 938, 915, and/or 1000) and the characteristics of a currently executing task. Debug registers 1350 control and allow for the monitoring of a processor or core's debugging operations.

Memory management registers 1365 specify the locations of data structures used in protected mode memory management. These registers may include a GDTR, IDRT, task register, and a LDTR register.

Alternative embodiments of the invention may use wider or narrower registers. Additionally, alternative embodiments of the invention may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figure 14:
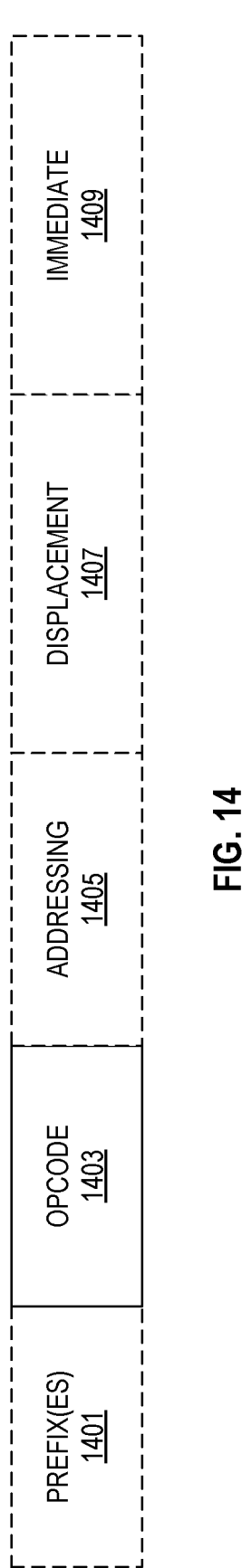
FIG. 14 illustrates embodiments of an instruction format.

FIG. 14 illustrates embodiments of an instruction format. As illustrated, an instruction may include multiple components including, but not limited to, one or more fields for: one or more prefixes 1401, an opcode 1403, addressing information 1405 (e.g., register identifiers, memory addressing information, etc.), a displacement value 1407, and/or an immediate 1409. Note that some instructions utilize some or all of the fields of the format whereas others may only use the field for the opcode 1403. In some embodiments, the order illustrated is the order in which these fields are to be encoded, however, it should be appreciated that in other embodiments these fields may be encoded in a different order, combined, etc.

The prefix(es) field(s) 1401, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1403 is used to at least partially define the operation to be performed upon a decoding of the instruction. In some embodiments, a primary opcode encoded in the opcode field 1403 is 1, 2, or 3 bytes in length. In other embodiments, a primary opcode can be a different length. An additional 3-bit opcode field is sometimes encoded in another field.

Figure 15:
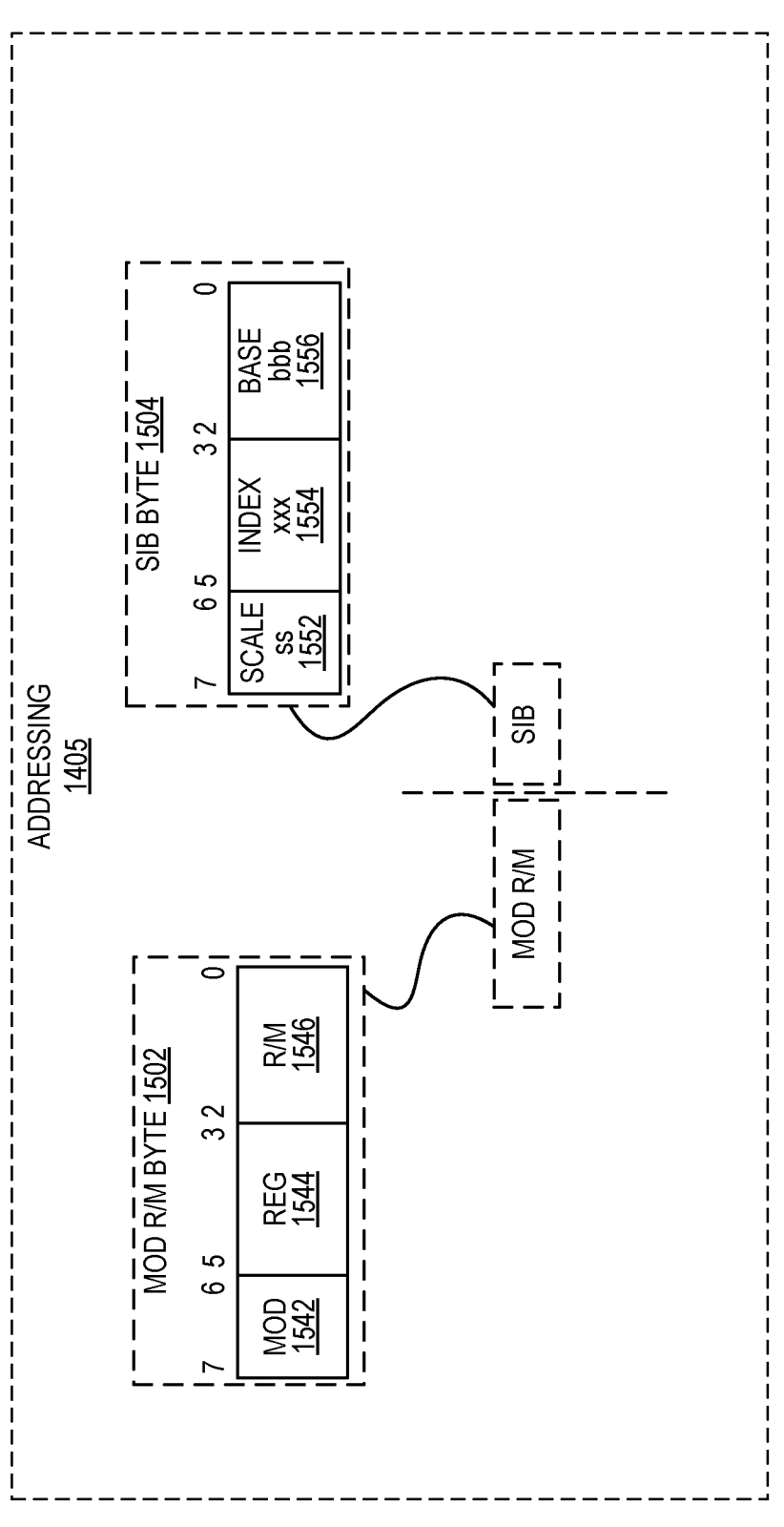
FIG. 15 illustrates embodiments of an addressing field.

The addressing field 1405 is used to address one or more operands of the instruction, such as a location in memory or one or more registers. FIG. 15 illustrates embodiments of the addressing field 1405. In this illustration, an optional ModR/M byte 1502 and an optional Scale, Index, Base (SIB) byte 1504 are shown. The ModR/M byte 1502 and the SIB byte 1504 are used to encode up to two operands of an instruction, each of which is a direct register or effective memory address. Note that each of these fields are optional in that not all instructions include one or more of these fields. The MOD R/M byte 1502 includes a MOD field 1542, a register field 1544, and R/M field 1546.

The content of the MOD field 1542 distinguishes between memory access and non-memory access modes. In some embodiments, when the MOD field 1542 has a value of b11, a register-direct addressing mode is utilized, and otherwise register-indirect addressing is used.

The register field 1544 may encode either the destination register operand or a source register operand, or may encode an opcode extension and not be used to encode any instruction operand. The content of register index field 1544, directly or through address generation, specifies the locations of a source or destination operand (either in a register or in memory). In some embodiments, the register field 1544 is supplemented with an additional bit from a prefix (e.g., prefix 1401) to allow for greater addressing.

The R/M field 1546 may be used to encode an instruction operand that references a memory address, or may be used to encode either the destination register operand or a source register operand. Note the R/M field 1546 may be combined with the MOD field 1542 to dictate an addressing mode in some embodiments.

The SIB byte 1504 includes a scale field 1552, an index field 1554, and a base field 1556 to be used in the generation of an address. The scale field 1552 indicates scaling factor. The index field 1554 specifies an index register to use. In some embodiments, the index field 1554 is supplemented with an additional bit from a prefix (e.g., prefix 1401) to allow for greater addressing. The base field 1556 specifies a base register to use. In some embodiments, the base field 1556 is supplemented with an additional bit from a prefix (e.g., prefix 1401) to allow for greater addressing. In practice, the content of the scale field 1552 allows for the scaling of the content of the index field 1554 for memory address generation (e.g., for address generation that uses $2^{scale}$*index+base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 1407 provides this value. Additionally, in some embodiments, a displacement factor usage is encoded in the MOD field of the addressing field 1405 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 1407.

In some embodiments, an immediate field 1409 specifies an immediate for the instruction. An immediate may be encoded as a 1-byte value, a 2-byte value, a 4-byte value, etc.

Figures 16, 17A, 17B, 17C, 17D:
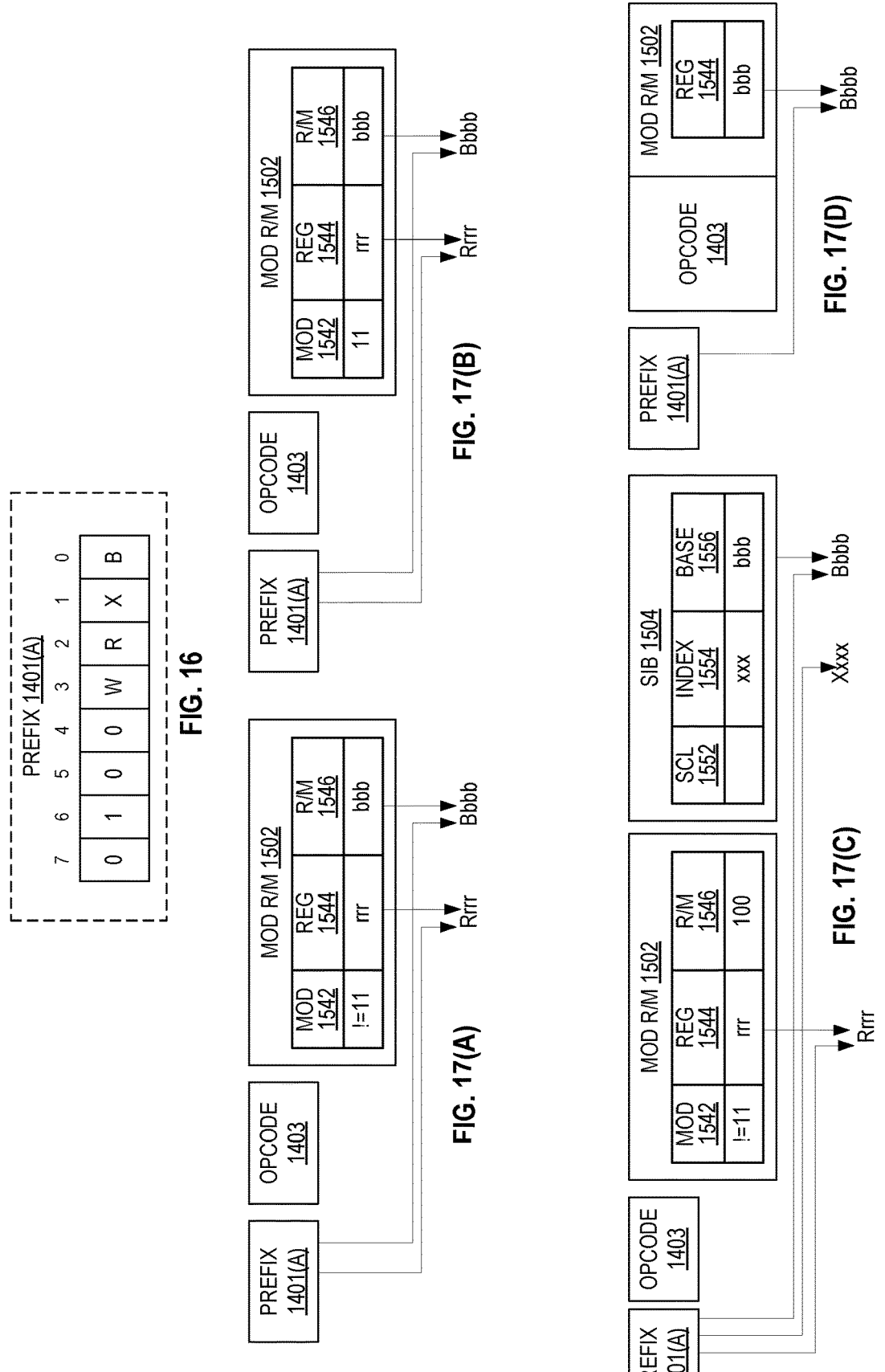
FIG. 16 illustrates embodiments of a first prefix.
FIGS. 17(A)-(D) illustrate embodiments of how the R, X, and B fields of the first prefix 1401(A) are used.

FIG. 16 illustrates embodiments of a first prefix 1401(A). In some embodiments, the first prefix 1401(A) is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1401(A) may specify up to three registers using 3-bit fields depending on the format: 1) using the reg field 1544 and the R/M field 1546 of the Mod R/M byte 1502; 2) using the Mod R/M byte 1502 with the SIB byte 1504 including using the reg field 1544 and the base field 1556 and index field 1554; or 3) using the register field of an opcode.

In the first prefix 1401(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1544 and MOD R/M R/M field 1546 alone can each only address 8 registers.

In the first prefix 1401(A), bit position 2 (R) may an extension of the MOD R/M reg field 1544 and may be used to modify the ModR/M reg field 1544 when that field encodes a general purpose register, a 64-bit packed data register (e.g., a SSE register), or a control or debug register. R is ignored when Mod R/M byte 1502 specifies other registers or defines an extended opcode.

Bit position 1 (X) X bit may modify the SIB byte index field 1554.

Bit position B (B) B may modify the base in the Mod R/M R/M field 1546 or the SIB byte base field 1556; or it may modify the opcode register field used for accessing general purpose registers (e.g., general purpose registers 1325).

FIGS. 17(A)-(D) illustrate embodiments of how the R, X, and B fields of the first prefix 1401(A) are used. FIG. 17(A) illustrates R and B from the first prefix 1401(A) being used to extend the reg field 1544 and R/M field 1546 of the MOD R/M byte 1502 when the SIB byte 1504 is not used for memory addressing. FIG. 17(B) illustrates R and B from the first prefix 1401(A) being used to extend the reg field 1544 and R/M field 1546 of the MOD R/M byte 1502 when the SIB byte 1504 is not used (register-register addressing). FIG. 17(C) illustrates R, X, and B from the first prefix 1401(A) being used to extend the reg field 1544 of the MOD R/M byte 1502 and the index field 1554 and base field 1556 when the SIB byte 1504 being used for memory addressing. FIG. 17(D) illustrates B from the first prefix 1401(A) being used to extend the reg field 1544 of the MOD R/M byte 1502 when a register is encoded in the opcode 1403.

Figures 18A, 18B:
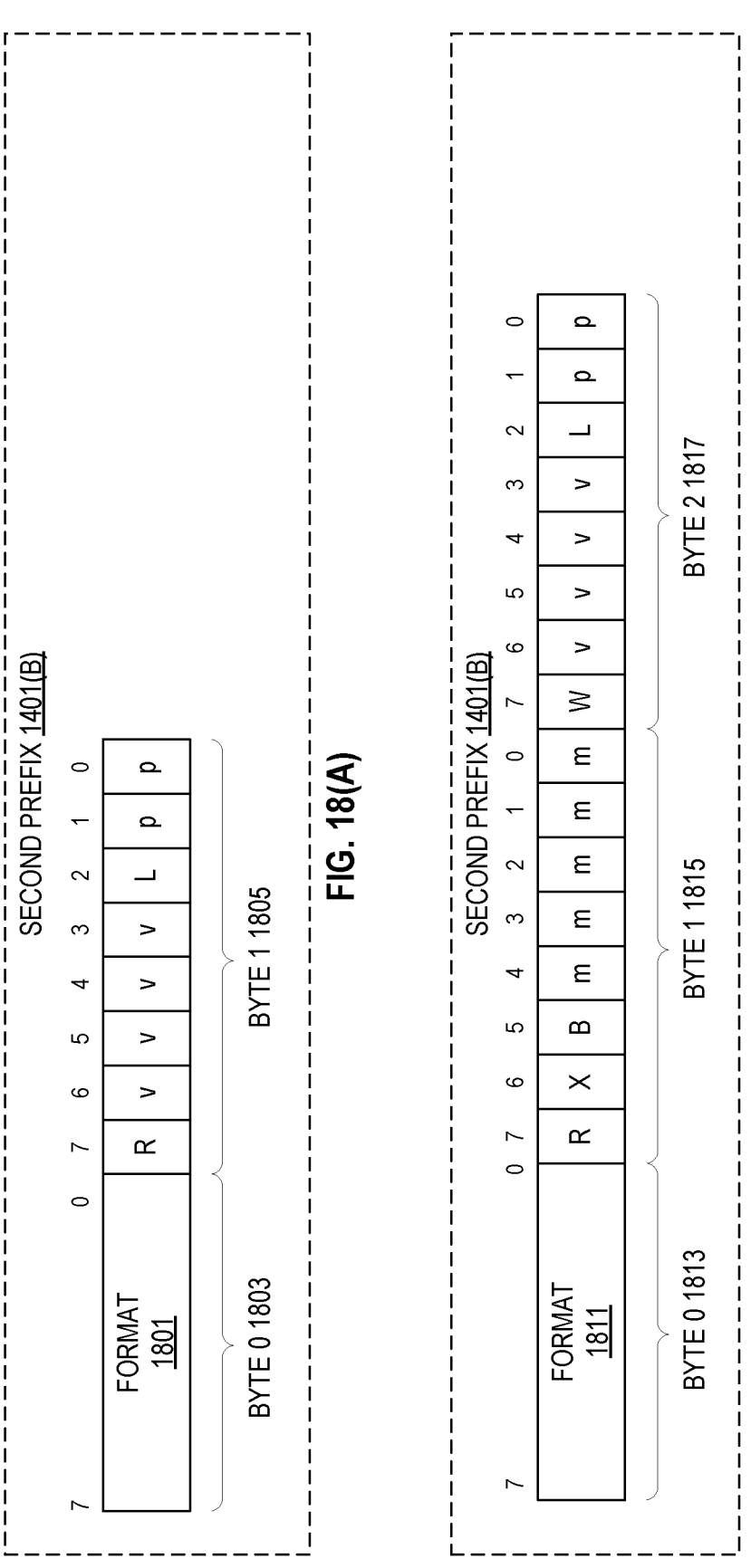
FIGS. 18(A)-(B) illustrate embodiments of a second prefix.

FIGS. 18(A)-(B) illustrate embodiments of a second prefix 1401(B). In some embodiments, the second prefix 1401(B) is an embodiment of a VEX prefix. The second prefix 1401(B) encoding allows instructions to have more than two operands, and allows SIMD vector registers (e.g., vector/SIMD registers 1310) to be longer than 64-bits (e.g., 128-bit and 256-bit). The use of the second prefix 1401(B) provides for three-operand (or more) syntax. For example, previous two-operand instructions performed operations such as A=A+B, which overwrites a source operand. The use of the second prefix 1401(B) enables operands to perform nondestructive operations such as A=B+C.

In some embodiments, the second prefix 1401(B) comes in two forms—a two-byte form and a three-byte form. The two-byte second prefix 1401(B) is used mainly for 128-bit, scalar, and some 256-bit instructions; while the three-byte second prefix 1401(B) provides a compact replacement of the first prefix 1401(A) and 3-byte opcode instructions.

FIG. 18(A) illustrates embodiments of a two-byte form of the second prefix 1401(B). In one example, a format field 1801 (byte 0 1803) contains the value C5H. In one example, byte 1 1805 includes a "R" value in bit[7]. This value is the complement of the same value of the first prefix 1401(A). Bit[2] is used to dictate the length (L) of the vector (where a value of 0 is a scalar or 128-bit vector and a value of 1 is a 256-bit vector). Bits[1:0] provide opcode extensibility equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1546 to encode the instruction operand that references a memory address or encode either the destination register operand or a source register operand.

Instructions that use this prefix may use the Mod R/M reg field 1544 to encode either the destination register operand or a source register operand, be treated as an opcode extension and not used to encode any instruction operand.

For instruction syntax that support four operands, vvvv, the Mod R/M R/M field 1546 and the Mod R/M reg field 1544 encode three of the four operands. Bits[7:4] of the immediate 1409 are then used to encode the third source register operand.

FIG. 18(B) illustrates embodiments of a three-byte form of the second prefix 1401(B). in one example, a format field 1811 (byte 0 1813) contains the value C4H. Byte 1 1815 includes in bits[7:5]"R," "X," and "B" which are the complements of the same values of the first prefix 1401(A). Bits[4:0] of byte 1 1815 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1817 is used similar to W of the first prefix 1401(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensibility equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1546 to encode the instruction operand that references a memory address or encode either the destination register operand or a source register operand.

Instructions that use this prefix may use the Mod R/M reg field 1544 to encode either the destination register operand or a source register operand, be treated as an opcode extension and not used to encode any instruction operand.

For instruction syntax that support four operands, vvvv, the Mod R/M R/M field 1546, and the Mod R/M reg field 1544 encode three of the four operands. Bits[7:4] of the immediate 1409 are then used to encode the third source register operand.

Figure 19:
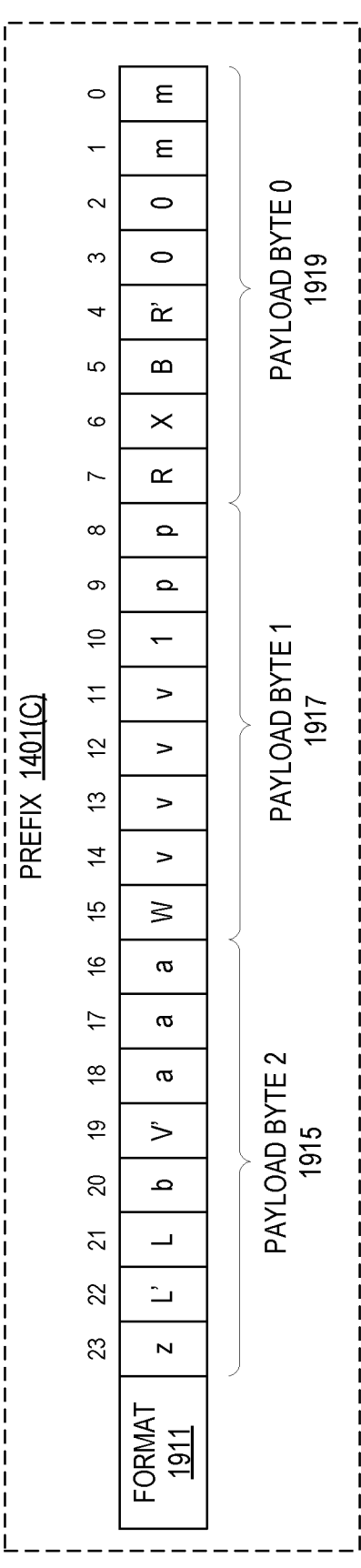
FIG. 19 illustrates embodiments of a third prefix.

FIG. 19 illustrates embodiments of a third prefix 1401(C). In some embodiments, the first prefix 1401(A) is an embodiment of an EVEX prefix. The third prefix 1401(C) is a four-byte prefix.

The third prefix 1401(C) can encode 32 vector registers (e.g., 128-bit, 256-bit, and 512-bit registers) in 64-bit mode.

In some embodiments, instructions that utilize a writemask/opmask (see discussion of registers in a previous figure, such as FIG. 13) or predication utilize this prefix. Opmask register allow for conditional processing or selection control. Opmask instructions, whose source/destination operands are opmask registers and treat the content of an opmask register as a single value, are encoded using the second prefix 1401(B).

The third prefix 1401(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1401(C) is a format field 1911 that has a value, in one example, of 62H. Subsequent bytes are referred to as payload bytes 1915-1919 and collectively form a 24-bit value of P[23:0] providing specific capability in the form of one or more fields (detailed herein).

In some embodiments, P[1:0] of payload byte 1919 are identical to the low two mmmmm bits. P[3:2] are reserved in some embodiments. Bit P[4](R') allows access to the high 16 vector register set when combined with P[7] and the ModR/M reg field 1544. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1544 and ModR/M R/M field 1546. P[9:8] provide opcode extensibility equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1401(A) and second prefix 1411(B) and may serve as an opcode extension bit or operand size promotion.

P[18:16] specify the index of a register in the opmask (writemask) registers (e.g., writemask/predicate registers 1315). In one embodiment of the invention, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22: 21]). P[23] indicates support for merging-writemasking (e.g., when set to 0) or support for zeroing and merging-writemasking (e.g., when set to 1).

Exemplary embodiments of encoding of registers in instructions using the third prefix 1401(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1] | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 20:
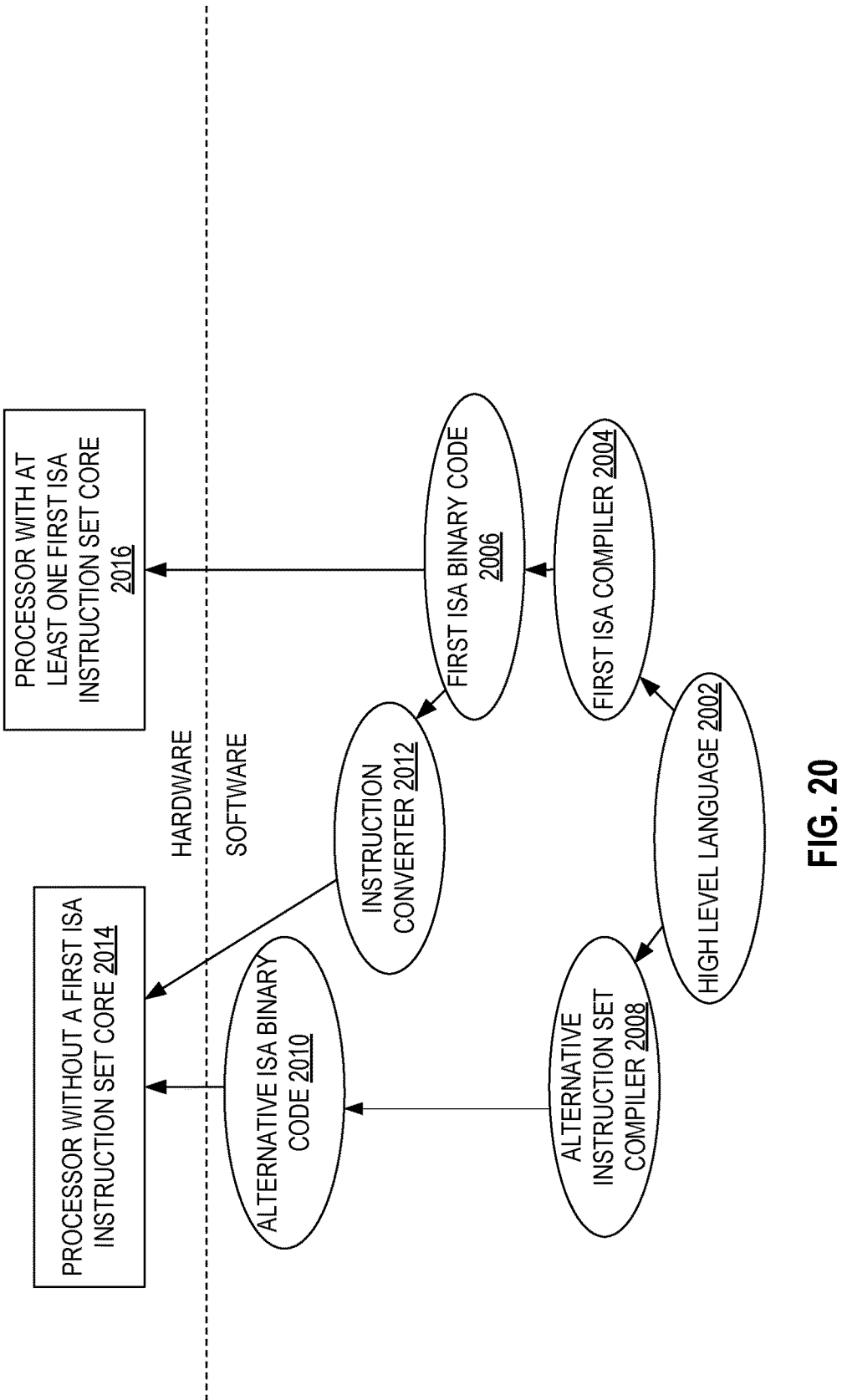
FIG. 20 illustrates a block diagram contrasting the use of a software instruction converter to convert binary instructions in a source instruction set to binary instructions in a target instruction set according to embodiments of the invention.

FIG. 20 illustrates a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 20 shows a program in a high-level language 2002 may be compiled using a first ISA compiler 2004 to generate first ISA binary code 2006 that may be natively executed by a processor with at least one first instruction set core 2016. The processor with at least one first ISA instruction set core 2016 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 2004 represents a compiler that is operable to generate first ISA binary code 2006 (e.g., object code) that can, with or without additional linkage processing, be executed on the processor with at least one first ISA instruction set core 2016. Similarly, FIG. 20 shows the program in the high-level language 2002 may be compiled using an alternative instruction set compiler 2008 to generate alternative instruction set binary code 2010 that may be natively executed by a processor without a first ISA instruction set core 2014. The instruction converter 2012 is used to convert the first ISA binary code 2006 into code that may be natively executed by the processor without a first ISA instruction set core 2014. This converted code is not likely to be the same as the alternative instruction set binary code 2010 because an instruction converter capable of this is difficult to make; however, the converted code will accomplish the general operation and be made up of instructions from the alternative instruction set. Thus, the instruction converter 2012 represents software, firmware, hardware, or a combination thereof that, through emulation, simulation or any other process, allows a processor or other electronic device that does not have a first ISA instruction set processor or core to execute the first ISA binary code 2006.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Exemplary support for operations involving packed BF16 data elements include, but are not limited to:

1. An apparatus comprising:
    decode circuitry to decode an instance of a single instruction, the single instruction to include fields for an opcode, an identification of a location of a packed data source operand, and an identification of a packed data destination operand, wherein the opcode is to indicate that execution circuitry is to perform, for each data element position of the packed data source operand, a calculation of a square root value of a BF16 data element in that position and store a result of each square root into a corresponding data element position of the packed data destination operand; and
  the execution circuitry to execute the decoded instruction according to the opcode.

2. The apparatus of example 1, wherein the field for the identification of the first source operand is to identify a vector register.

3. The apparatus of example 1, wherein the field for the identification of the first source operand is to identify a memory location.

4. The apparatus of any of examples 1-3, wherein the execution circuitry is to treat denormal data elements as zeros during execution of the decoded instruction.

5. The apparatus of any of examples 1-4, wherein the execution circuitry is to suppress numerical flags during execution of the decoded instruction.

6. The apparatus of any of examples 1-5, wherein the instruction is to further include one or more fields for a writemask register.

7. The apparatus of any of examples 1-5, wherein the instruction is to further include one or more fields for a predication register.

8. A system comprising:
  memory to store an instance of a single instruction;
  decode circuitry to decode the instance of the single instruction, the single instruction to include fields for an opcode, an identification of a location of a packed data source operand, and an identification of a packed data destination operand, wherein the opcode is to indicate that execution circuitry is to perform, for each data element position of the packed data source operand, a calculation of a square root value of a BF16 data element in that position and store a result of each square root into a corresponding data element position of the packed data destination operand; and
  the execution circuitry to execute the decoded instruction according to the opcode.

9. The system of example 8, wherein the field for the identification of the first source operand is to identify a vector register.

10. The system of example 8, wherein the field for the identification of the first source operand is to identify a memory location.

11. The system of any of examples 8-10, wherein the execution circuitry is to treat denormal data elements as zeros during execution of the decoded instruction.

12. The system of any of examples 8-11, wherein the execution circuitry is to suppress numerical flags during execution of the decoded instruction.

13. The system of any of examples 8-12, wherein the instruction is to further include one or more fields for a writemask register.

14. The system of examples 8-12 wherein the instruction is to further include one or more fields for a predication register.

15. A method comprising:
  decoding an instance of a single instruction, the single instruction to include fields for an opcode, an identification of a location of a packed data source operand, and an identification of a packed data destination operand, wherein the opcode is to indicate that execution circuitry is to perform, for each data element position of the packed data source operand, a calculation of a square root value of a BF16 data element in that position and store a result of each square root into a corresponding data element position of the packed data destination operand; and executing the decoded instruction according to the opcode.

16. The method of example 15, wherein the field for the identification of the first source operand is to identify a vector register.

17. The method of example 15, wherein the field for the identification of the first source operand is to identify a memory location.

18. The method of any of examples 15-17, wherein the execution circuitry is to treat denormal data elements as zeros during execution of the decoded instruction.

19. The method of any of examples 15-18, wherein the instruction is to further include one or more fields for a predication register.

20. The method of any of examples 15-19, further comprising:

decoding the single instruction into one or more instructions of a second instruction set architecture, wherein the executing comprises executing the one or more instructions of a second instruction set architecture.

21. An apparatus comprising:

decode circuitry to decode an instance of a single instruction, the single instruction to include fields for an opcode, an identification of a location of a packed data source operand, and an identification of a packed data destination operand, wherein the opcode is to indicate that execution circuitry is to perform, for each data element position of the packed data source operand, a calculation of a reciprocal square root value of a BF16 data element in that position and store a result of each reciprocal square root into a corresponding data element position of the packed data destination operand; and the execution circuitry to execute the decoded instruction according to the opcode.

22. The apparatus of example 21, wherein the field for the identification of the first source operand is to identify a vector register.

23. The apparatus of example 21, wherein the field for the identification of the first source operand is to identify a memory location.

24. The apparatus of any of examples 21-23, wherein the execution circuitry is to treat denormal data elements as zeros during execution of the decoded instruction.

25. The apparatus of any of examples 21-24, wherein the execution circuitry is to suppress numerical flags during execution of the decoded instruction.

26. The apparatus of any of examples 21-25, wherein the instruction is to further include one or more fields for a writemask register.

27. The apparatus of any of examples 21-25, wherein the instruction is to further include one or more fields for a predication register.

28. A system comprising:

memory to store an instance of a single instruction;

decode circuitry to decode the instance of the single instruction, the single instruction to include fields for an opcode, an identification of a location of a packed data source operand, and an identification of a packed data destination operand, wherein the opcode is to indicate that execution circuitry is to perform, for each data element position of the packed data source operand, a calculation of a reciprocal square root value of a BF16 data element in that position and store a result of each reciprocal square root into a corresponding data element position of the packed data destination operand; and the execution circuitry to execute the decoded instruction according to the opcode.

29. The system of example 28, wherein the field for the identification of the first source operand is to identify a vector register.

30. The system of example 28, wherein the field for the identification of the first source operand is to identify a memory location.

31. The system of any of examples 28-30, wherein the execution circuitry is to treat denormal data elements as zeros during execution of the decoded instruction.

32. The system of any of examples 28-31, wherein the execution circuitry is to suppress numerical flags during execution of the decoded instruction.

33. The system of any of examples 28-32, wherein the instruction is to further include one or more fields for a writemask register.

34. The system of any of examples 28-33, wherein the instruction is to further include one or more fields for a predication register.

35. A method comprising:

decoding an instance of a single instruction, the single instruction to include fields for an opcode, an identification of a location of a packed data source operand, and an identification of a packed data destination operand, wherein the opcode is to indicate that execution circuitry is to perform, for each data element position of the packed data source operand, a calculation of a reciprocal square root value of a BF16 data element in that position and store a result of each reciprocal square root into a corresponding data element position of the packed data destination operand; and executing the decoded instruction according to the opcode.

36. The method of example 35, wherein the field for the identification of the first source operand is to identify a vector register.

37. The method of example 35, wherein the field for the identification of the first source operand is to identify a memory location.

38. The method of any of examples 35-37, wherein the execution circuitry is to treat denormal data elements as zeros during execution of the decoded instruction.

39. The method of any of examples 35-38, wherein the instruction is to further include one or more fields for a predication register.

40. The method of any of examples 35-39, further comprising:

decoding the single instruction into one or more instructions of a second instruction set architecture, wherein the executing comprises executing the one or more instructions of a second instruction set architecture.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:

decode circuitry to decode an instance of a single instruction, the single instruction to include fields for an opcode, an identification of a location of a packed data source operand, and an identification of a packed data destination operand, wherein the opcode is to indicate that execution circuitry is to perform, for each data element position of the packed data source operand, a calculation of a square root value of a BF 16 data element in that position and store a result of each square root into a corresponding data element position of the packed data destination operand; and the execution circuitry to execute the decoded instruction according to the opcode, wherein the execution circuitry is to suppress numerical flags during execution of the decoded instruction, treat input denormal data elements as zeros during execution of the decoded instruction, round to a nearest even, and flush output denormal data elements to zero.

2. The apparatus of claim 1, wherein the identification of the source operand is to identify a vector register.

3. The apparatus of claim 1, wherein the identification of the source operand is to identify a memory location.

4. The apparatus of claim 1, wherein the execution circuitry is to treat denormal data elements as zeros during execution of the decoded instruction.

5. The apparatus of claim 1, wherein the instruction is to further include one or more fields for a writemask register.

6. The apparatus of claim 1, wherein the instruction is to further include one or more fields for a predication register.

7. A system comprising:

memory to store an instance of a single instruction;

decode circuitry to decode the instance of the single instruction, the single instruction to include fields for an opcode, an identification of a location of a packed data source operand, and an identification of a packed data destination operand, wherein the opcode is to indicate that execution circuitry is to perform, for each data element position of the packed data source operand, a calculation of a square root value of a BF 16 data element in that position and store a result of each square root into a corresponding data element position of the packed data destination operand; and the execution circuitry to execute the decoded instruction according to the opcode, wherein the execution circuitry is to suppress numerical flags during execution of the decoded instruction, treat input denormal data elements as zeros during execution of the decoded instruction, round to a nearest even, and flush output denormal data elements to zero.

8. The system of claim 7, wherein the identification of the source operand is to identify a vector register.

9. The system of claim 7, wherein the identification of the source operand is to identify a memory location.

10. The system of claim 7, wherein the execution circuitry is to treat denormal data elements as zeros during execution of the decoded instruction.

11. The system of claim 7, wherein the instruction is to further include one or more fields for a writemask register.

12. The system of claim 7, wherein the instruction is to further include one or more fields for a predication register.

13. A method comprising:

decoding an instance of a single instruction, the single instruction to include fields for an opcode, an identification of a location of a packed data source operand, and an identification of a packed data destination operand, wherein the opcode is to indicate that execution circuitry is to perform, for each data element position of the packed data source operand, a calculation of a square root value of a BF 16 data element in that position and store a result of each square root into a corresponding data element position of the packed data destination operand; and executing the decoded instruction according to the opcode using execution circuitry, wherein the execution circuitry is to treat input denormal data elements as zeros during execution of the decoded instruction, round to a nearest even, suppress numerical flags during execution of the decoded instruction, and flush output denormal data elements to zero.

14. The method of claim 13, wherein the identification of the source operand is to identify a vector register.

15. The method of claim 13, wherein the identification of the fit source operand is to identify a memory location.

16. The method of claim 13, wherein the instruction is to further include one or more fields for a predication register.

17. The method of claim 13, further comprising:

decoding the single instruction into one or more instructions of a second instruction set architecture, wherein the executing comprises executing the one or more instructions of a second instruction set architecture.

* * * * *